US012581453B2

(12) United States Patent　(10) Patent No.: US 12,581,453 B2
Lu et al.　(45) Date of Patent: Mar. 17, 2026

(54) INFORMATION TRANSMISSION METHOD AND RELATED DEVICE FOR POSITIONING REFERENCE SIGNAL (PRS) TRANSMISSION

(71) Applicant: GUANGDONG OPPO MOBILE TELECOMMUNICATIONS CORP., LTD., Dongguan (CN)

(72) Inventors: Qianxi Lu, Dongguan (CN); Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 450 days.

(21) Appl. No.: 18/105,544

(22) Filed: Feb. 3, 2023

(65) Prior Publication Data

US 2023/0189201 A1　Jun. 15, 2023

Related U.S. Application Data

(63) Continuation of application No. PCT/CN2020/107555, filed on Aug. 6, 2020.

(51) Int. Cl.
　H04W 64/00　(2009.01)
　G01S 5/02　(2010.01)
(52) U.S. Cl.
　CPC ......... H04W 64/006 (2013.01); G01S 5/0236 (2013.01)
(58) Field of Classification Search
　CPC ... H04W 64/006; H04W 4/029; H04W 64/00; G01S 5/0236
　USPC ...................................................... 455/456.2
　See application file for complete search history.

(56) References Cited

U.S. PATENT DOCUMENTS

| | | | | |
|---|---|---|---|---|
| 10,862,530 | B2 * | 12/2020 | Chen ....................... | H04W 4/02 |
| 11,290,229 | B2 * | 3/2022 | Chuang ............... | H04W 72/044 |
| 11,310,760 | B2 * | 4/2022 | Yamada ............... | H04B 7/0617 |
| 2015/0365790 | A1 | 12/2015 | Edge et al. | |
| 2019/0037338 | A1 | 1/2019 | Edge et al. | |
| 2019/0166452 | A1 | 5/2019 | Tenny et al. | |
| 2019/0380056 | A1 | 12/2019 | Lee et al. | |
| 2020/0107286 | A1 | 4/2020 | Akkarakaran et al. | |
| 2020/0137715 | A1 | 4/2020 | Edge et al. | |
| 2021/0320769 | A1 | 10/2021 | Cha et al. | |

(Continued)

FOREIGN PATENT DOCUMENTS

| | | |
|---|---|---|
| CN | 107465497 A | 12/2017 |
| CN | 110719148 A | 1/2020 |
| CN | 111108718 A | 5/2020 |

(Continued)

OTHER PUBLICATIONS

Synchronization Signal Block—Dec. 16, 2019 (Year: 2019).*

(Continued)

*Primary Examiner* — Rafael Pérez-Gutiérrez
*Assistant Examiner* — Aaron C. Deditch
(74) *Attorney, Agent, or Firm* — BAYES PLLC

(57) ABSTRACT

Embodiments of the present application provide an information transmission method and a related device. The method comprises: a position management network element obtaining a parameter of a PRS for non-periodic transmission; and sending the parameter to a terminal. The embodiments of the present application facilitate improving the resource utilization rate and the positioning flexibility.

20 Claims, 7 Drawing Sheets

(56)                    References Cited

U.S. PATENT DOCUMENTS

2022/0026517 A1*   1/2022   Hasegawa ............. G01S 5/0236
2023/0224848 A1*   7/2023   Dong ................... H04W 64/00
                                                        455/456.1

FOREIGN PATENT DOCUMENTS

EP          3860241 A1      8/2021
JP          2020005128 A    1/2020
JP          2022511642 A    2/2022
WO          2020010269 A1   1/2020
WO          WO-2020/056273 A1 *  3/2020   ............ H04W 36/08
WO          2020065894 A1   4/2020
WO          2020092714 A1   5/2020

OTHER PUBLICATIONS

Second Office action issued in corresponding Japanese Application No. 2023-507219, mailed Dec. 17, 2024, 11 pages.
Communication pursuant to Article 94(3) EPC issued in corresponding European Application No. 20948781.8, mailed Feb. 5, 2025, 7 pages.
Second Office action issued in corresponding Chinese Application No. 202311467544.4, mailed Feb. 6, 2025, 16 pages.
"Introduction of positioning support over F1AP", 3GPP TSG-RAN WG3 Meeting #108-e, R3-204477, Jun. 1-12, 2020, 159 pages.
Extended European Search Report issued in European application No. 20948781.8, mailed May 22, 2023.
Catt et al., "New WID on NR Positioning Enhancements", RP-202900, 3GPP TSG RAN Meeting #90e Electronic Meeting, Dec. 7-11, 2020.
International Search Report issued in International application No. PCT/CN2020/107555, mailed Mar. 3, 2021.
Written Opinion of the International Searching Authority issued in International application No. PCT/CN2020/107555, mailed Mar. 3, 2021.
First Office Action issued in corresponding Indian application No. 202317010499, mailed May 16, 2024.
First Office Action issued in corresponding Japanese application No. 2023-507219, mailed Jun. 4, 2024.
Second Office Action issued in corresponding European application No. 20948781.8, mailed Jul. 30, 2024.
Source: CATT; Title: Discussion of NR positioning enhancements 3GPP TSG RAN WG1 Meeting #101 R1-2003642 e-meeting, May 25-Jun. 5, 2020.
Source: CMCC; Title: Discussion on DL PRS design 3GPP TSG RAN WG1 #99 R1-1912548 Reno, USA, Nov. 18-22, 2019.
Notice of Priority Examination of Patent Application issued in corresponding Chinese Application No. 202311467544.4, dated Oct. 23, 2024, 9 pages.
First Office Opinion Notice issued in corresponding Chinese Application No. 202311467544.4, dated Nov. 14, 2024. 16 pages.
First Office Action issued in European application No. 20948781.8, mailed Feb. 13, 2024.
Decision of Rejection issued in corresponding Chinese Application No. 202311467544.4, mailed on May 14, 2025, 14 pages.
First Office action issued in corresponding Korean Application No. 10-2023-7005787, mailed on Sep. 29, 2025, 12 pages.

* cited by examiner

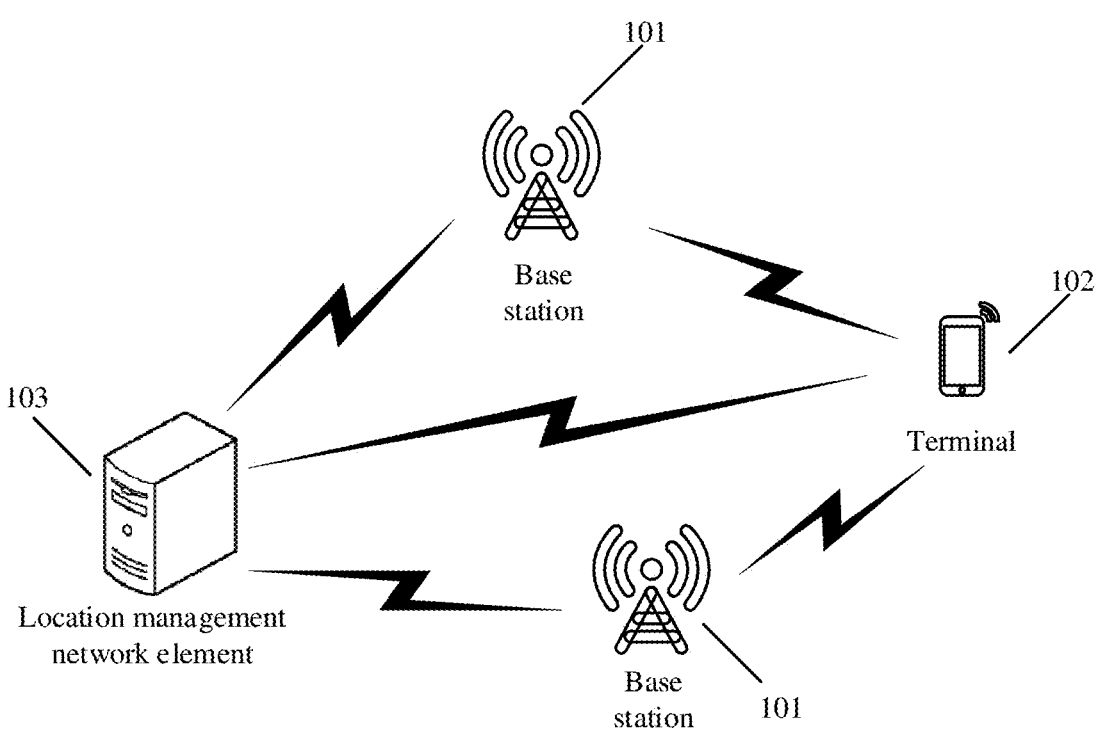

FIG. 1

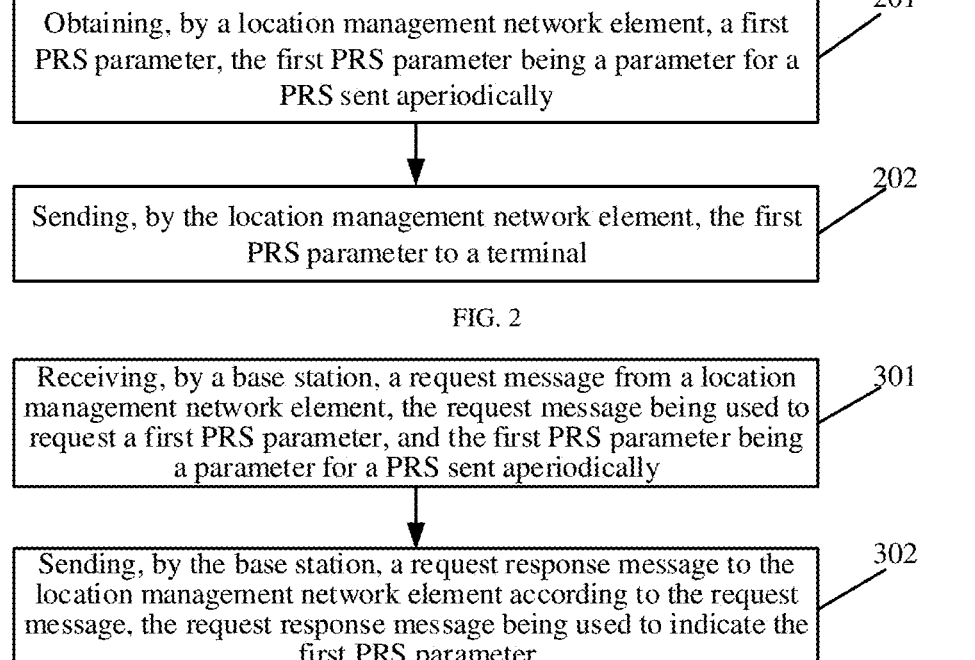

FIG. 2

| |
|---|
| Receiving, by a base station, a request message from a location management network element, the request message being used to request a first PRS parameter, and the first PRS parameter being a parameter for a PRS sent aperiodically    301 |

| |
|---|
| Sending, by the base station, a request response message to the location management network element according to the request message, the request response message being used to indicate the first PRS parameter    302 |

FIG. 3

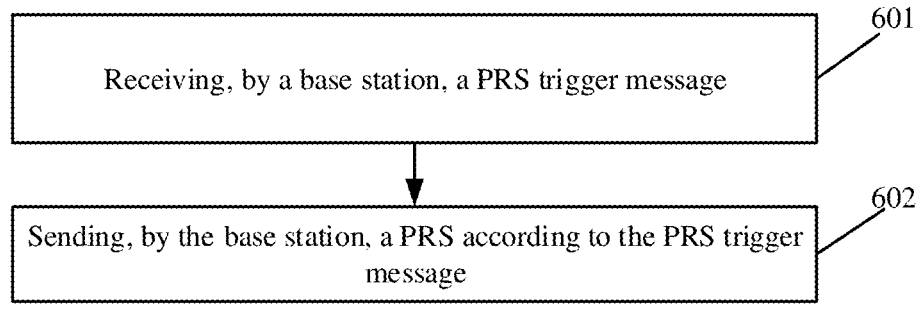

Receiving, by a base station, a PRS trigger message — 601

Sending, by the base station, a PRS according to the PRS trigger message — 602

FIG. 6

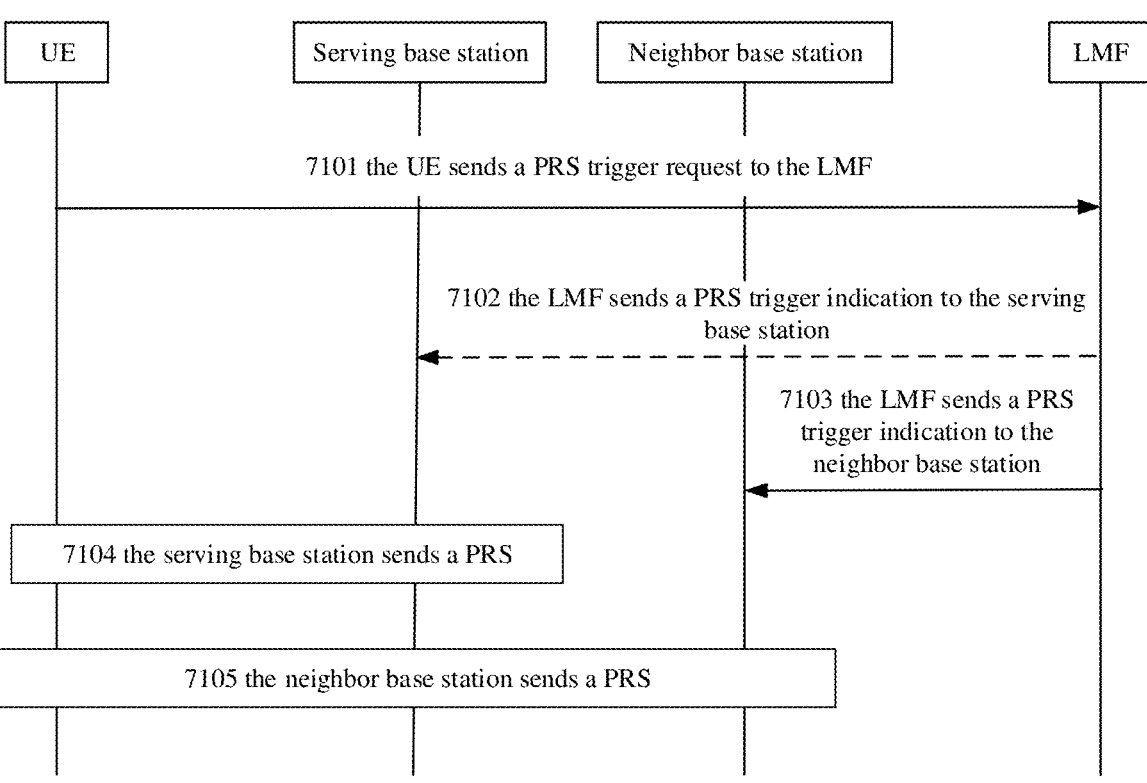

| UE | Serving base station | Neighbor base station | LMF |

7101 the UE sends a PRS trigger request to the LMF 7102 the LMF sends a PRS trigger indication to the serving base station 7103 the LMF sends a PRS trigger indication to the neighbor base station 7104 the serving base station sends a PRS 7105 the neighbor base station sends a PRS

FIG. 7a

INFORMATION TRANSMISSION METHOD AND RELATED DEVICE FOR POSITIONING REFERENCE SIGNAL (PRS) TRANSMISSION

CROSS-REFERENCE TO RELATED APPLICATION

The present application is a continuation of International Application No. PCT/CN2020/107555 filed on Aug. 6, 2020, the entire disclosure of which is incorporated herein by reference in its entirety.

TECHNICAL FIELD

The present disclosure relates to the field of communication technologies, and in particular, to an information transmission method and related device.

BACKGROUND

With the continuous development of communication technologies, requirements for positioning are increasing high, including accuracy requirements, delay requirements, and so on. However, the inventor(s) has realized that existing positioning technologies have problems such as low resource utilization and poor positioning flexibility. Therefore, how to realize positioning to improve the resource utilization has become an urgent problem to be solved.

SUMMARY

Embodiments of the present disclosure provide an information transmission method and a related device, which facilitate to improve resource utilization and improve positioning flexibility.

In an aspect, embodiments of the present disclosure provide an information transmission method, including: obtaining, by a location management network element, a first Positioning Reference Signal (PRS) parameter, where the first PRS parameter is a parameter for a PRS sent aperiodically; and sending, by the location management network element, the first PRS parameter to a terminal.

In another aspect, embodiments of the present disclosure further provide an information transmission method, including: receiving, by a base station, a request message from a location management network element, where the request message is used for requesting a first PRS parameter, and the first PRS parameter is a parameter for a PRS sent aperiodically; and sending, by the base station, a request response message to the location management network element according to the request message, where the request response message is used for indicating the first PRS parameter.

In still another aspect, embodiments of the present disclosure further provide an information transmission method, including: receiving, by a terminal, a first PRS parameter from a location management network element, where the first PRS parameter is a parameter for a PRS sent aperiodically.

In still another aspect, embodiments of the present disclosure further provide an information transmission method, including: sending, by a location management network element, a Positioning Reference Signal (PRS) trigger indication to at least one base station, where the PRS trigger indication is used for instructing a base station to send a PRS.

In still another aspect, embodiments of the present disclosure further provide an information transmission method, including: receiving, by a base station, a Positioning Reference Signal (PRS) trigger message, where the PRS trigger message is used for triggering sending of a PRS; and sending, by the base station, the PRS according to the PRS trigger message.

In still another aspect, embodiments of the present disclosure further provide an information transmission method, including: sending, by a terminal, a Positioning Reference Signal (PRS) trigger request to a location management network element, where the PRS trigger request is used for requesting to send a PRS.

In still another aspect, embodiments of the present disclosure provide a location management network element. The location management network element has some or all functions for implementing operations of the location management network element in the method described above. Optionally, the functions may be implemented by means of hardware or hardware executing corresponding software. The hardware or the software may include one or more units or modules corresponding to the functions described above.

For example, in a possible design, the location management network element may include a processing unit and a communication unit. The processing unit may be configured to support the location management network element to perform functions corresponding to the method described above. The communication unit may be configured to support the location management network element to communicate with other devices. Optionally, the location management network element may further include a storage unit. The storage unit may be coupled with the processing unit and store program instructions, data and the like which are necessary for the location management network element. Optionally, the processing unit may be a processor, the communication unit may be a transceiver, and the storage unit may be a memory.

In still another aspect, embodiments of the present disclosure provide a base station. The base station has some or all functions for implementing operations of the base station in the method described above. Optionally, the functions may be implemented by means of hardware or hardware executing corresponding software. The hardware or the software may include one or more units or modules corresponding to the functions described above.

For example, in a possible design, the base station may include a processing unit and a communication unit. The processing unit may be configured to support the base station to perform functions corresponding to the method described above. The communication unit may be configured to support the base station to communicate with other devices. Optionally, the base station may further include a storage unit. The storage unit may be coupled with the processing unit and store program instructions, data and the like which are necessary for the base station. Optionally, the processing unit may be a processor, the communication unit may be a transceiver, and the storage unit may be a memory.

In still another aspect, embodiments of the present disclosure provide a terminal. The terminal has some or all functions for implementing operations of the terminal in the method described above. Optionally, the functions may be implemented by means of hardware or hardware executing corresponding software. The hardware or the software may include one or more units or modules corresponding to the functions described above.

For example, in a possible design, the terminal may include a processing unit and a communication unit. The processing unit may be configured to support the terminal to perform functions corresponding to the method described above. The communication unit may be configured to support the terminal to communicate with other devices. Optionally, the terminal may further include a storage unit. The storage unit may be coupled with the processing unit and store program instructions, data and the like which are necessary for the terminal. Optionally, the processing unit may be a processor, the communication unit may be a transceiver, and the storage unit may be a memory.

In still another aspect, embodiments of the present disclosure provide a location management network element, including a processor, a memory, a communication interface, and one or more programs. The one or more programs is stored in the memory and configured to be executed by the processor. The one or more programs includes instructions configured for performing steps performed by the location management network element in any of the methods according to embodiments of the present disclosure.

In still another aspect, embodiments of the present disclosure provide a base station, including a processor, a memory, a communication interface, and one or more programs. The one or more programs is stored in the memory and configured to be executed by the processor. The one or more programs includes instructions configured for performing steps performed by the base station in any of the methods according to embodiments of the present disclosure.

In still another aspect, embodiments of the present disclosure provide a terminal, including a processor, a memory, a communication interface, and one or more programs. The one or more programs is stored in the memory and configured to be executed by the processor. The one or more programs includes instructions configured for performing steps performed by the terminal in any of the methods according to embodiments of the present disclosure.

In still another aspect, embodiments of the present disclosure provide a communication system, including the location management network element, the base station, and/or the terminal in the foregoing aspects. Optionally, the system may further include other devices that interact with the location management network element, the base station or the terminal.

In still another aspect, embodiments of the present disclosure provide a computer-readable storage medium. The computer-readable storage medium stores a computer program, and the computer program causes a computer to execute some or all of steps described in the methods according to embodiments of the present disclosure. For example, the computer is caused to perform some or all of steps performed by the location management network element, some or all of steps performed by the base station, and/or some or all of steps performed by the terminal as described in the methods according to embodiments of the present disclosure. Optionally, the computer-readable storage medium may be volatile or non-volatile, which is not limited in the present disclosure.

In still another aspect, embodiments of the present disclosure provide a computer program product. The computer program product includes a non-transitory computer-readable storage medium storing a computer program. The computer program is operable to cause a computer to execute some or all of steps described in the methods according to embodiments of the present disclosure. For example, the computer is caused to perform some or all of steps performed by the location management network element, some or all of steps performed by the base station, and/or some or all of steps performed by the terminal as described in the methods according to embodiments of the present disclosure. Optionally, the computer program product may be a software installation package.

In the solutions provided by embodiments of the present disclosure, it is possible to trigger sending of a PRS on demand, thereby improving the resource utilization and improving the positioning flexibility.

BRIEF DESCRIPTION OF THE DRAWINGS

The accompanying drawings that are required to be used in the description of embodiments or the relevant art will be introduced below.

FIG. 1 is an architecture diagram of a communication system provided by an embodiment of the present disclosure;

FIG. 2 is a schematic flowchart of an information transmission method provided by an embodiment of the present disclosure;

FIG. 3 is a schematic flowchart of another information transmission method provided by an embodiment of the present disclosure;

FIG. 6 is a schematic flowchart of still another information transmission method provided by an embodiment of the present disclosure:

FIG. 7a is a schematic interactive diagram of still another information transmission method provided by an embodiment of the present disclosure:

DETAILED DESCRIPTION

Figure 4A:
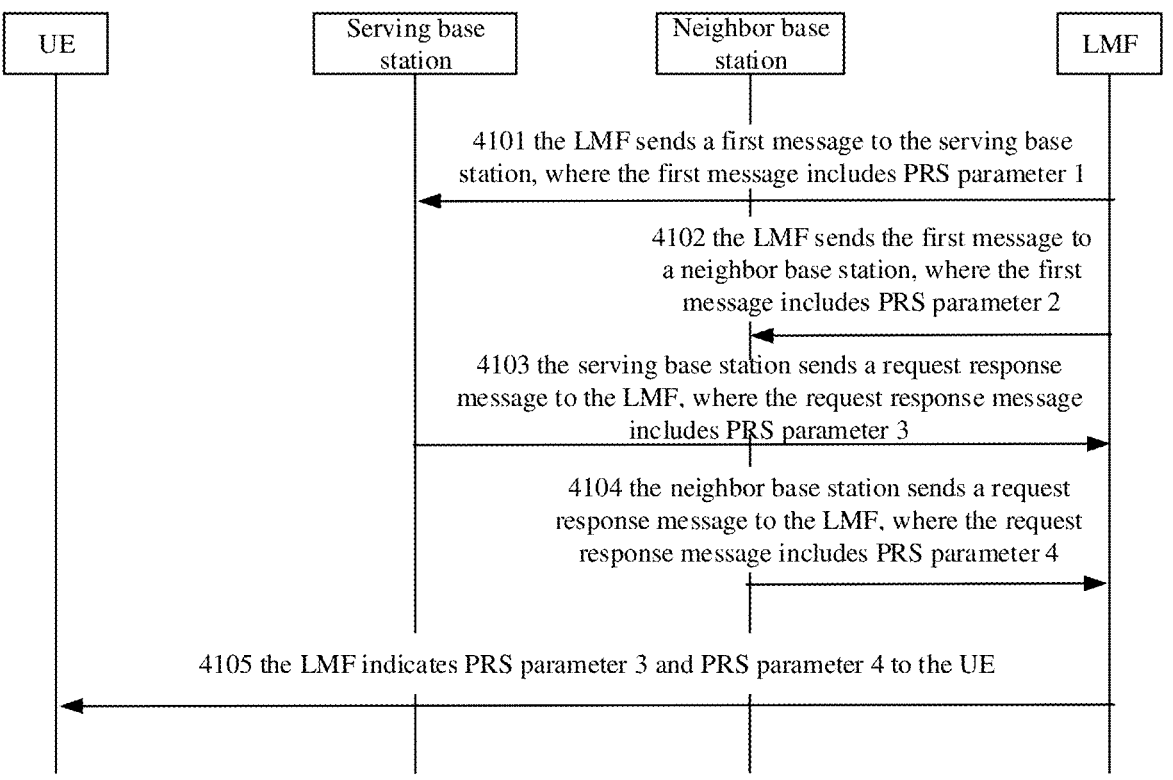
FIG. 4a is a schematic interactive diagram of an information transmission method provided by an embodiment of the present disclosure.

The technical solutions in embodiments of the present disclosure will be described below with reference to the accompanying drawings.

It can be understood that the technical solutions of the present disclosure can be specifically applied to various communication systems, for example, the 5th Generation (5G) systems such as New Radio (NR) systems, Long Term Evolution (LTE) systems or future communication systems, etc., which are not limited in the present disclosure.

With reference to FIG. 1, it is an architecture diagram of a communication system provided by the present disclosure. As shown in FIG. 1, the communication system may include: one or more base stations 101, one or more terminals 102, and one or more location management network elements 103. Only two base stations 101, one terminal 102 and one location management network element 103 are shown in FIG. 1. Information transmission can be performed between the base stations 101, the terminal 102, and the location management network element 103.

In the present disclosure, the location management network element may be used for location management, including obtaining a PRS parameter, and/or transmitting the PRS parameter, and so on. For example, the location management network element may be a Location management Function (LMF), or may be other network elements used for location management, which is not limited in the present disclosure.

In the present disclosure, the base station can be configured to communicate with one or more terminals, can also be configured to communicate with the location management network element, and can also be configured to communicate with one or more base stations with partial terminal functions (such as the communication between a macro station and a micro base station). The base station may be an Evolutional Node B (eNB) in a Long Term Evolution (LTE) system, and may also be a gNB in a 5G system or an NR system, etc., which are not listed one by one here. Alternatively, the base station 101 may also refer to a Transmission Point (TP), an Access Point (AP), a Transmission and Receiver Point (TRP), a relay device, a Central Unit (CU), or other devices with base station functions, etc.

In the present disclosure, the terminal may be a device with communication functions, for example, a vehicle-mounted device, a wearable device, a hand-held device (such as a smart phone), and the like. The terminal may also be called other names, such as User Equipment (UE), user unit, mobile station, mobile unit, terminal device, communication device, etc., which are not limited in the present disclosure.

In the communication system, there are often scenarios in which it is necessary to position the terminal or other devices, and positioning technologies have also developed rapidly. For example, the positioning technologies may include: positioning technologies based on GNSS providing location information in outdoor scenarios: positioning technologies based on radio technologies (for example, in LTE networks, various options are provided to position users, wireless networks, terrestrial beacon systems, etc.): positioning technologies based on Inertial Measurement Units (IMUs): positioning technologies based on sensors (such as tracking user locations based on accelerometers, vertical positioning using gyroscopes, magnetometers or atmospheric pressure sensors): positioning technologies based on OTDOA, UTDOA, Cell-ID (with cell portion ID) or E-Cell-ID: LPP-based RAT-independent positioning technologies, standalone RAT-dependent positioning technologies based on NR, including positioning technologies based on DL-TDOA, DL-AOD, UL-TDOA, UL-AoA, RTT and E-CID, etc. For example, 3GPP NR can perform temporal measurement based on the OTDOA, UTDOA, Cell-ID or E-Cell-ID positioning technologies and using a large bandwidth (low and high frequency bands) to achieve user positioning, thereby improving a positioning performance. Also, a massive MIMO system can be used to achieve more accurate user localization in combination with the temporal measurement and spatial and angular domains of a propagation channel.

A Positioning Reference Signal (PRS) is a reference signal used for positioning. The terminal can measure information such as time of arrival, signal strength, and inclination of arrival based on a PRS sent by a network side, so as to determine a location of the terminal based on the information, thereby realizing positioning. For example, the terminal may determine its own location based on the information and report it to the network. For another example, the terminal may report the information to the network, so that the network side determines the location of the terminal based on the information, thereby realizing positioning. The sending of the PRS may be configured by the LMF. For example, a periodic configuration may be adopted. However, periodically sending the PRS may have the problem of low resource utilization, resulting in high resource consumption. The sending of the PRS in the present disclosure can be performed on demand. Compared with periodic sending, the PRS can be sent rapidly and instantly, which facilitates to improve resource utilization, improve positioning flexibility, and reduce network power consumption. For example, in the present disclosure, the location management network element such as the LMF obtains a first PRS parameter, that is, a parameter for a PRS sent aperiodically, and then sends the first PRS parameter to the terminal, so as to realize positioning based on the parameter for the PRS sent aperiodically. For another example, in the present disclosure, the location management network element such as the LMF may also send a PRS trigger indication to at least one base station, so as to trigger the base station to send the PRS, thereby realizing positioning. For another example, in the present disclosure, the location management network element can also obtain the first PRS parameter, and sends the PRS trigger indication to the at least one base station for triggering the base station to send the PRS according to the first PRS parameter, so as to realize positioning.

In the present disclosure, the PRS parameter may also be called other names, such as PRS information, PRS trigger parameter, etc., which are not limited in the present disclosure. The PRS trigger indication may also be called a PRS indication, a trigger indication, a PRS sending indication, a sending indication, etc., which is not limited in the present disclosure.

It can be understood that the PRS sent aperiodically is different from the PRS sent periodically. That is, a parameter for the PRS sent aperiodically is different from a parameter for the PRS sent periodically. For example, compared to the PRS sent periodically, the PRS sent aperiodically has a different time resource attribute. Optionally, the PRS sent aperiodically may also be called an aperiodic PRS, a PRS being aperiodic, or other names. Correspondingly, the PRS sent periodically may also be called a periodic PRS, a PRS being periodic, or other names. The parameter for the PRS sent aperiodically may also be called an aperiodic PRS parameter, a parameter for an aperiodic PRS, a PRS flexible trigger parameter, etc. The parameter for the PRS sent periodically may also be called a periodic PRS parameter, a parameter for a periodic PRS, a PRS periodic trigger parameter, etc., which are not limited in the present disclosure.

In the present disclosure, when positioning is performed on the terminal or other devices, the periodic PRS and the aperiodic PRS may also be combined to realize positioning. For example, the location management network element may obtain the aperiodic PRS parameter and the periodic PRS parameter, and then send the aperiodic PRS parameter and the periodic PRS parameter to the terminal, so as to realize positioning based on the aperiodic PRS parameter and the periodic PRS parameter. For another example, in the present disclosure, the location management network element may also send the PRS trigger indication to the at least one base station to trigger the base station to send the PRS, the base station may also send the periodic PRS, and the terminal may realize positioning based on the triggered PRS and the periodic PRS. The parameter for the aperiodic PRS may be obtained in advance, for example, specified by a protocol, or sent to the terminal by the location management network element, and so on. The periodic PRS and the aperiodic PRS may be combined to realize positioning, which facilitates to reduce the network power consumption and improve the resource utilization, while improving positioning reliability. For example, an interval (period) of the periodic PRS in a scenario, where the periodic PRS and the aperiodic PRS are combined to realize positioning, may be greater than an interval of the periodic PRS in a scenario, where only the periodic PRS is used to realize positioning. This greatly reduces the overhead of sending the PRS, saves a network resource, and facilitates to improve the resource utilization. Optionally, the positioning may also be implemented in combination with a plurality of positioning technologies. For example, the positioning may be implemented in combination with the positioning technology of the present disclosure and one or more of the above-mentioned positioning technologies, so as to improve the positioning performance.

Optionally, the interval of the periodic PRS may be determined according to a frequency of the aperiodic PRS within a preset time period. For example, the higher the frequency of the aperiodic PRS, the larger the interval of the periodic PRS may be set. Further optionally, the interval of the periodic PRS may be changed or switched in a scenario where the aperiodic PRS is triggered to realize positioning. For example, the location management network element may initiate a procedure for switching the interval of the periodic PRS, for example, increasing the interval of the periodic PRS by a specified interval, when receiving the PRS trigger request for the aperiodic PRS, determining to send the PRS trigger indication, and obtaining the first PRS parameter. It can be understood that the procedure for switching the interval of the periodic PRS may also be triggered by the terminal or the base station, which is not limited in the present disclosure.

It can be understood that the communication system shown in FIG. 1 is only an example, and does not constitute any limitation to the present disclosure. Those of ordinary skill in the art can appreciate that with the evolution of the network architecture and the emergence of new service scenarios, the technical solutions provided in the present disclosure are also applicable to similar technical problems.

With reference to FIG. 2, it is a schematic flowchart of an information transmission method provided by an embodiment of the present disclosure. The method in an embodiment may be applied to the above-mentioned communication system, and may be specifically applied to the above-mentioned location management network element. As shown in FIG. 2, the method may include the following steps 201 to 202.

In 201, a location management network element obtains a first PRS parameter, where the first PRS parameter is a parameter for a PRS sent aperiodically.

Optionally, the first PRS parameter may include one or more of the following parameters: a frequency resource parameter for the PRS, and a time resource parameter for the PRS. For example, the time resource parameter for the PRS may include effective time information. The effective time information may be used to indicate a specific time for sending the PRS, and the effective time information is different from the time interval information corresponding to a PRS sent periodically. Further optionally, the effective time information may include a start time, an end time, an effective duration (sending duration) with respect to the sending of the PRS, and/or an effective time period with respect to the sending of the PRS, etc., Further optionally, PRS resource configuration information, such as time-frequency domain resource parameters, may include one or more of the following: a frequency domain position for sending the PRS, a resource sending combo, a sending cyclic shift, a sending resource starting position, the number of symbols occupied by a resource, a repetition factor, etc.

Further optionally, the first PRS parameter may further include one or more of the following: a PRS resource type, and PRS spatial relationship information. For example, the PRS resource type may include a periodic PRS, a semi-static PRS, or an aperiodic PRS (for example, the PRS resource type of the first PRS parameter indicates the aperiodic PRS). The PRS spatial relationship information may include beam information of a terminal, which may include, for example, one or more of the following: an index of a synchronization signal and physical broadcast channel block of a serving cell (serving base station), an index of a synchronization signal and physical broadcast channel block of a neighbor cell (neighbor base station), a reference signal index of channel state information, a reference signal index of non-zero power channel state information, a channel sounding reference signal resource identity, and a channel sounding reference signal positioning resource identity.

In 202, the location management network element sends the first PRS parameter to a terminal.

After obtaining the aperiodic PRS parameter, that is, the first PRS parameter, the location management network element may send (indicate) the first PRS parameter to the terminal. The terminal may receive the first PRS parameter from the location management network element in order to receive the PRS based on the first PRS parameter.

It can be understood that when the location management network element sends the first PRS parameter to the terminal, it may send the first PRS parameter to the terminal through the serving base station. That is, the location management network element sends the first PRS parameter to the serving base station, and the serving base station sends the first PRS parameter to the terminal. Alternatively, the location management network element may directly send the first PRS parameter to the terminal, etc., which is not limited in the present disclosure.

Optionally, when the location management network element obtains the first PRS parameter, it may determine the first PRS parameter through negotiation with the base station, or may directly request the first PRS parameter from the base station, or may obtain the first PRS parameter in other ways, which is not limited in the present disclosure.

For example, in a possible implementation, the location management network element may send a first message to the base station (at least one base station). The first message may include a second PRS parameter, such as a parameter for the proposed aperiodic PRS. Further, the location management network element may receive the first PRS parameter sent by the base station, such as a the first PRS parameter sent through a request response message, so as to obtain the first PRS parameter. The location management network element may in turn send the obtained first PRS parameter to the terminal. Optionally, the first PRS parameter and the second PRS parameter may be the same or different.

For another example, in a possible implementation, the location management network element may send a second message to the base station (at least one base station), and the second message may include the first PRS parameter. Further, if the location management network element receives a confirmation message sent by the base station, it may send the obtained first PRS parameter to the terminal.

For another example, in a possible implementation, the location management network element may send a third message to the base station (at least one base station), and the third message may be used to request the first PRS parameter. Further, the location management network element may receive the first PRS parameter sent by the base station, so as to obtain the first PRS parameter. The location management network element may in turn send the obtained first PRS parameter to the terminal.

Optionally, the first PRS parameter may include one or more sets of aperiodic PRS parameters, and/or the second PRS parameter may include one or more sets of aperiodic PRS parameters. For example, each set of aperiodic PRS parameters may correspond to one PRS. Each set of aperiodic PRS parameters may include the frequency resource parameter for the PRS and/or the time resource parameter for the PRS, and the like.

In a possible implementation, the location management network element may also obtain a periodic PRS parameter, and send (indicate) the periodic PRS parameter to the terminal, so that the terminal may realize positioning in combination with the aperiodic PRS parameter and the periodic PRS parameter. Optionally, the periodic PRS parameter may include one or more of the following: a PRS resource types such as the periodic PRS, PRS spatial relationship information, and PRS resource configuration information such as the time-frequency domain resource parameters. The PRS resource configuration information may include one or more of the following: period information for sending the PRS, a frequency domain location for sending the PRS, and so on. It can be understood that the periodic PRS parameter is different from the first PRS parameter. That is, the periodic PRS parameter is different from the aperiodic PRS parameter. The terminal may determine whether it is the periodic PRS parameter or the aperiodic PRS parameter based on a specific parameter content. For example, the resource configuration information of the periodic PRS parameter is different from the resource configuration information of the aperiodic PRS parameter. For example, the periodic PRS parameter includes periodic information (such as time interval) for sending the PRS. That is, the time resource parameter for the periodic PRS parameter is different from the time resource parameter for the aperiodic PRS parameter. For another example, the spatial relationship information of the periodic PRS parameter is different from the spatial relationship information of the aperiodic PRS parameter. Optionally, the periodic PRS parameter and the aperiodic PRS parameter may be sent to the terminal through different signaling, or may be sent to the terminal through the same signaling.

In an embodiment, the location management network element may obtain the aperiodic PRS parameter and send it to the terminal, so that the terminal receives the PRS based on the aperiodic PRS parameter, thereby realizing positioning. Thus, the sending of the PRS may be triggered on demand, thereby improving the resource utilization and improve the positioning flexibility.

With reference to FIG. 3, it is a schematic flowchart of an information transmission method provided by an embodiment of the present disclosure. The method in an embodiment may be applied to the above-mentioned communication system, and may be specifically applied to the above-mentioned base station. As shown in FIG. 3, the method may include the following steps 301 to 302.

In 301, a base station receives a request message from a location management network element, where the request message is used to request a first PRS parameter, and the first PRS parameter is a parameter for a PRS sent aperiodically.

For the description of the first PRS parameter, reference may be made to the relevant description in the foregoing embodiment, which is not repeated here.

In 302, the base station sends a request response message to the location management network element according to the request message, where the request response message is used to indicate the first PRS parameter.

That is, the location management network element may request the base station for the parameter for the PRS sent aperiodically, that is, information of the first PRS parameter, and the base station may receive the request message sent by the location management network element to indicate the information of the first PRS parameter to the location management network element. Thus, the location management network element may obtain the first PRS parameter, so as to realize positioning based on the first PRS parameter. Optionally, the request response message may indicate or carry one or more sets of aperiodic PRS parameters.

In a possible implementation, the request message may be a first message, and the first message may include a second PRS parameter. The base station may send the first PRS parameter to the location management network element according to the first message. For example, the base station sends the request response message to the location management network element, and the request response message carries the first PRS parameter. Optionally, the first PRS parameter and the second PRS parameter may be the same or different.

In a possible implementation, the request message may be a second message, the second message may include the first PRS parameter, and the request response message may be a confirmation message. That is, the location management network element may send the second message to the base station, and the base station may receive the second message, and reply to the location management network element with the confirmation message if confirming that the PRS parameter included in the second message is adopted.

In a possible implementation, the request message may be a third message. That is, the base station may send the request response message to the location management network element according to the third message. The request response message includes the first PRS parameter.

In an embodiment, the base station indicates the information of the aperiodic PRS parameter to the location management network element based on the request message sent by the location management network element for requesting the aperiodic PRS parameter. Thus, the location management network element may obtain the aperiodic PRS parameter, so as to realize positioning based on the aperiodic PRS parameter. In this way, the sending of the PRS may be triggered on demand, thereby improving the resource utilization and improving the positioning flexibility.

In combination with FIGS. 2 and 3, with further reference to FIG. 4*a*, it is a schematic interactive diagram of an information transmission method provided by an embodiment of the present disclosure. In an embodiment, taking the location management network element being a LMF, the base station including a serving base station and one neighbor base station, and the terminal being a UE as an example, the LMF may send the proposed PRS parameter to each base station, and the base station returns the aperiodic PRS parameter (that is, the first PRS parameter) based on the proposed PRS parameter, so that the first PRS parameter is further indicated to the UE. As shown in FIG. 4*a*, the method may include the following steps 4101 to 4105.

In 4101, the LMF sends a first message to the serving base station, where the first message includes PRS parameter 1.

In 4102, the LMF sends a first message to the neighbor base station, where the first message includes PRS parameter 2.

The serving base station may receive the first message sent by the LMF, and the neighbor base station may receive the first message sent by the LMF. It can be understood that PRS parameter 1 and PRS parameter 2 are the above-mentioned second PRS parameter. For example, PRS parameter 1 and PRS parameter 2 may be parameters for the PRS sent aperiodically, such as the parameter for the PRS sent aperiodically and proposed by the LMF, which may also be referred to as the proposed PRS flexible trigger parameter.

Optionally, the first message may be NRPPa signaling. That is, the LMF may send the NRPPa signaling to respective base stations to indicate the proposed PRS parameters for the corresponding base stations, respectively.

It can be understood that an execution order of the step 4101 and the step 4102 is not limited. For example, the step 4102 may be executed first, and then the step 4101 may be executed. Alternatively, the step 4101 and the step 4102 may be executed simultaneously, which is not limited in the present disclosure.

In 4103, the serving base station sends a request response message to the LMF, where the request response message includes PRS parameter 3.

In 4104, the neighbor base station sends a request response message to the LMF, where the request response message includes PRS parameter 4.

The LMF may receive PRS parameter 3 sent by the serving base station and PRS parameter 4 sent by the neighbor base station. PRS parameter 3 and PRS parameter 4 are the above-mentioned first PRS parameter. PRS parameter 3 and PRS parameter 4 are parameters for the PRS sent aperiodically, such as parameters for the PRS sent aperiodically determined according to the PRS flexible trigger parameter proposed by the LMF.

Optionally, PRS parameters corresponding to different base stations may be the same or different. For example, PRS parameter 1 and PRS parameter 2 may be different, and PRS parameter 3 and PRS parameter 4 may also be different.

It can be understood that an execution order of the step 4102 and the step 4103 is not limited. For example, the step 4103 may be executed first, and then the step 4102 may be executed, which is not limited in the present disclosure.

In 4105, the LMF indicates PRS parameter 3 and PRS parameter 4 to the UE.

For example, the first message sent by the LMF to the serving base station is on-demand PRS request for serving, and the first message sent by the LMF to the neighbor base station is on-demand PRS request for neighbor. The request response message sent by the serving base station to the LMF is on-demand PRS response for serving, and the request response message sent by the neighbor base station to the LMF is on-demand PRS response for neighbor. The LMF indicates PRS parameter 3 and PRS parameter 4 by sending an on-demand PRS indication message to the UE.

In a possible implementation, the LMF may send a PRS indication message to the UE, and the PRS indication message is used to indicate PRS parameter 3 and PRS parameter 4. For example, PRS parameter 3 and PRS parameter 4 are indicated to the UE by carrying an identity corresponding to the PRS parameter (for example, an identity corresponding to PRS parameter 3 and an identity corresponding to PRS parameter 4, or carrying identities corresponding to both PRS parameter 3 and PRS parameter 4) in the PRS indication message through a predefined correspondence between the PRS parameter and the identity. The UE may receive the PRS indication message, so that the UE may determine PRS parameter 3 and PRS parameter 4 according to the identity. Alternatively, the LMF may directly send PRS parameter 3 and PRS parameter 4 themselves to the UE, and the UE may receive PRS parameter 3 and PRS parameter 4, so that positioning may be realized based on PRS parameter 3 and PRS parameter 4. The present disclosure does not limit the way how the LMF indicates the PRS parameter to the UE.

In a possible implementation, the LMF may indicate PRS parameter 3 and PRS parameter 4 to the UE, respectively. For example, after obtaining PRS parameter 3, the LMF may immediately indicate PRS parameter 3 to the UE, and after obtaining PRS parameter 4, the LMF may immediately indicate PRS parameter 4 to the UE. Alternatively, in a possible implementation, after obtaining the PRS parameter returned by each base station, for example, after obtaining PRS parameter 3 and PRS parameter 4 in an embodiment, the LMF may indicate PRS parameter 3 and PRS parameter 4 to the UE through a message.

Optionally, the serving base station may send the PRS based on PRS parameter 3, and the neighbor base station may send the PRS based on PRS parameter 4, so as to realize positioning based on the PRS.

In an embodiment, the LMF may send the proposed PRS parameter to each base station, and each base station may return the aperiodic PRS parameter, that is, the first PRS parameter, based on the proposed PRS parameter. Then, the first PRS parameter is indicated to the UE to facilitate the terminal to receive the PRS based on the aperiodic PRS parameter for realizing positioning. Thus, the sending of the PRS may be triggered on demand, thereby improving the resource utilization, improving the positioning flexibility, and facilitating to reduce the network power consumption.

Figure 4B:
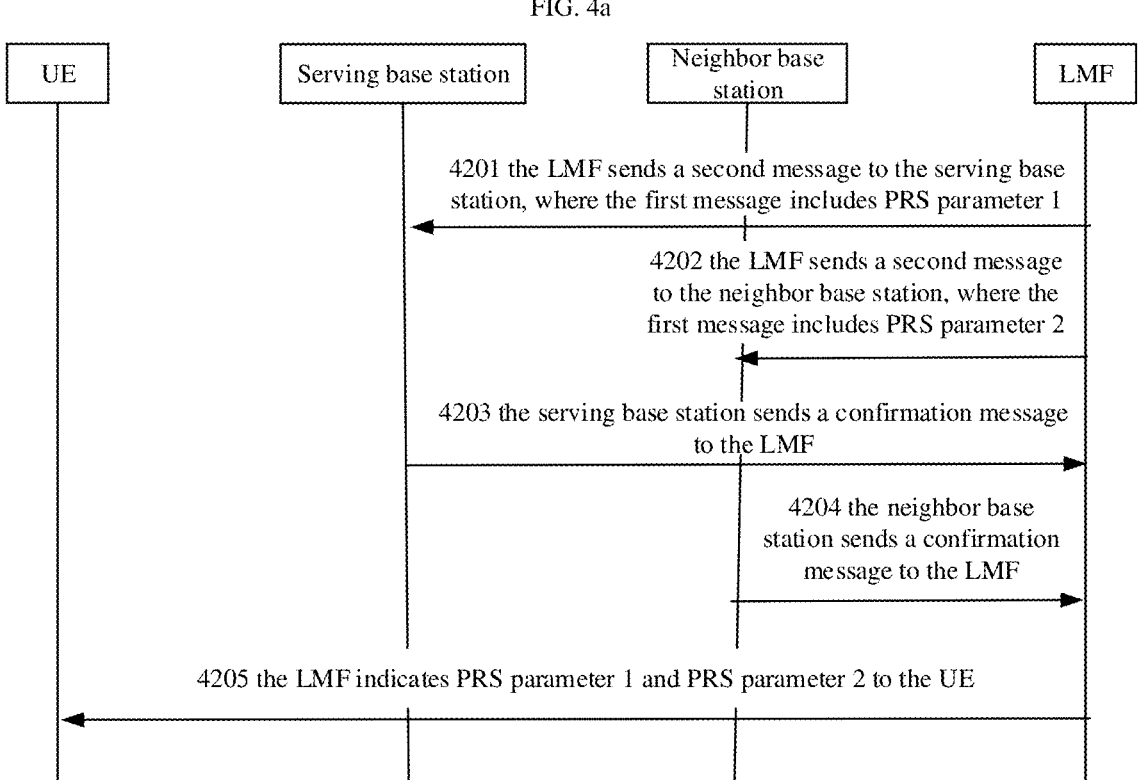
FIG. 4b is a schematic interactive diagram of another information transmission method provided by an embodiment of the present disclosure.

In combination with FIGS. 2 and 3, with further reference to FIG. 4*b*, it is a schematic interactive diagram of another information transmission method provided by an embodiment of the present disclosure. In an embodiment, taking the location management network element being a LMF, the base station including a serving base station and one neighbor base station, and the terminal being a UE as an example, the LMF may send an aperiodic PRS parameter to each base station, and indicate the aperiodic PRS parameter to the UE after the base station returns a confirmation message. As shown in FIG. 4*b*, the method may include the following steps 4201 to 4205.

In 4201, the LMF sends a second message to the serving base station, where the second message includes PRS parameter 1.

In 4202, the LMF sends a second message to the neighbor base station, where the second message includes PRS parameter 2.

The serving base station may receive the second message sent by the LMF, and the neighbor base station may receive the second message sent by the LMF. It can be understood that PRS parameter 1 and PRS parameter 2 are the above-mentioned first PRS parameter. Alternatively, it can be understood that PRS parameter 1 and PRS parameter 2 are the above-mentioned second PRS parameter. The second PRS parameter is the same as the first PRS parameter. In other words, the second PRS parameter is used as the first PRS parameter. PRS parameter 1 and PRS parameter 2 are parameters for the PRS sent aperiodically.

Optionally, the second message may be NRPPa signaling. That is, the LMF may send the NRPPa signaling to respective base stations to indicate the proposed PRS parameters for the corresponding base stations, respectively. Further optionally, PRS parameters corresponding to different base stations may be the same or different. For example, PRS parameter 1 and PRS parameter 2 may be different.

It can be understood that an execution order of the step 4201 and the step 4202 is not limited. For example, the step 4202 may be executed first, and then the step 4201 may be executed. Alternatively, the step 4201 and the step 4202 may be executed simultaneously, which is not limited in the present disclosure.

In 4203, the serving base station sends a confirmation message to the LMF.

In 4204, the neighbor base station sends a confirmation message to the LMF.

If the base station confirms that the PRS parameter indicated by the LMF is adopted, it may reply with a confirmation message, such as an Acknowledgment (ACK). In an embodiment, it is assumed that both the serving base station and the neighbor base station have replied with confirmation messages to the LMF. The LMF may receive the confirmation message sent by the serving base station and the confirmation message sent by the neighbor base station.

It can be understood that an execution order of the step 4202 and the step 4203 is not limited. For example, the step 4203 may be executed first, and then the step 4202 may be executed, which is not limited in the present disclosure.

In 4205, the LMF indicates PRS parameter 1 and PRS parameter 2 to the UE.

In a possible implementation, the LMF may indicate PRS parameter 1 and PRS parameter 2 to the UE, respectively, or may indicate PRS parameter 1 and PRS parameter 2 to the UE through a message after obtaining PRS parameter 1 and PRS parameter 2. Optionally, the LMF may indicate PRS parameter 1 and/or PRS parameter 2 by sending a PRS indication message to the UE. For the way how the LMF indicates the PRS parameter to the UE, reference may be made to the relevant descriptions in the foregoing embodiments, and details are not described here.

It can be understood that, in some embodiments, some base stations may send confirmation messages to the LMF, and some base stations may send the finally determined PRS parameters to the LMF, which are not limited in the present disclosure. For example, the serving base station sends the confirmation message to the LMF, and the neighbor base station sends the finally determined PRS parameter to the LMF. Based on the confirmation message replied by the serving base station, the LMF may use the PRS parameter sent to the serving base station as the PRS parameter indicated to the UE, and use the PRS parameter replied by the neighbor base station as the PRS parameter indicated to the UE.

In a possible implementation, if the base station (the serving base station or the neighbor base station) confirms that the PRS parameter indicated by the LMF is not adopted, it may also reply with a negative message, such as a negative acknowledgement (NACK), to the LMF, or make no reply. Optionally, if the LMF receives the negative message sent by the base station or does not receive any reply within a preset time, it may re-send a new PRS parameter to the base station. The new PRS parameter is also a parameter for the PRS sent aperiodically to facilitate the base station to determine the PRS parameter to be adopted. Alternatively, if the base station confirms that the PRS parameter indicated by the LMF is not adopted, it may also indicate other parameters for the PRS sent aperiodically, and the LMF may send the indicated PRS parameter to the UE.

Optionally, the serving base station may send the PRS based on PRS parameter 1, and the neighbor base station may send the PRS based on PRS parameter 2, so as to realize positioning based on the PRS.

In an embodiment, the LMF may send the aperiodic PRS parameter to each base station, and each base station performs confirmation. When receiving the confirmation message returned based on the aperiodic PRS parameter, the LMF indicates the aperiodic PRS parameter to the UE to facilitate the terminal to receive the PRS based on the aperiodic PRS parameter for realizing positioning. Thus, the sending of the PRS may be triggered on demand, thereby improving the resource utilization, improving the positioning flexibility, and facilitating to reduce the network power consumption.

Figure 4C:
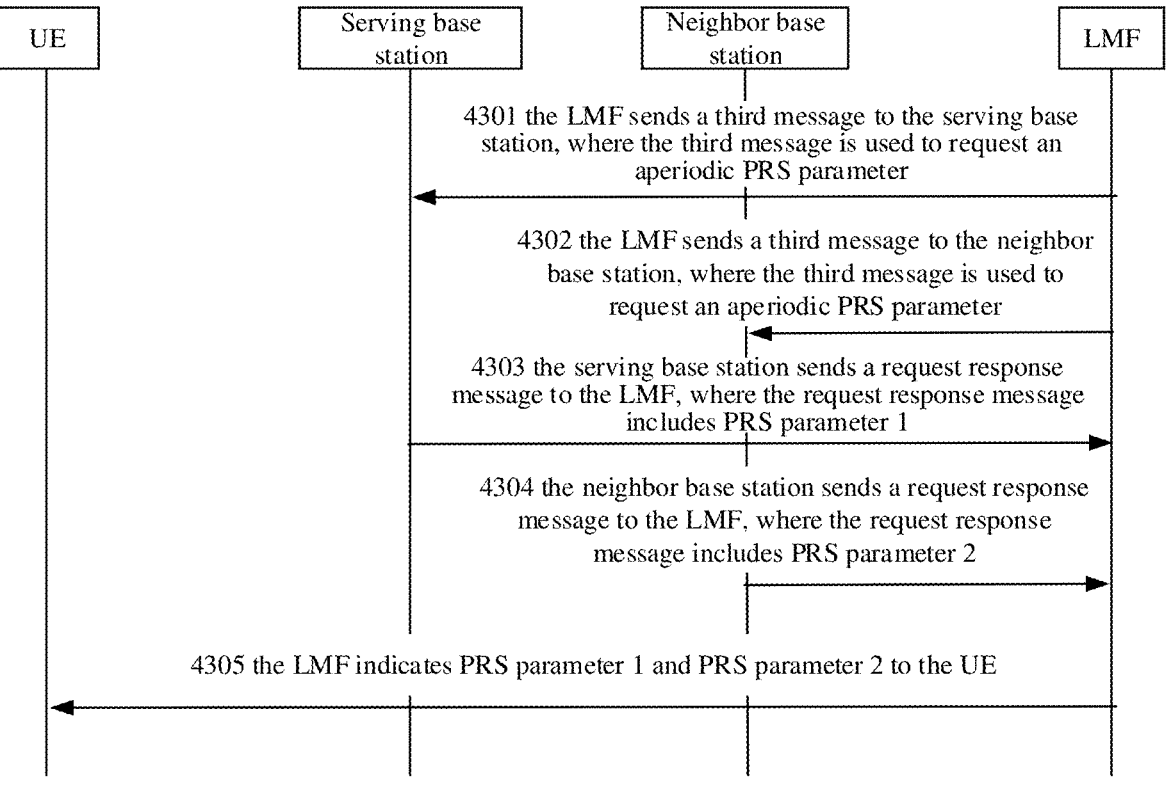
FIG. 4c is a schematic interactive diagram of still another information transmission method provided by an embodiment of the present disclosure.

In combination with FIGS. 2 and 3, with further reference to FIG. 4c, it is a schematic interactive diagram of still another information transmission method provided by an embodiment of the present disclosure. In an embodiment, taking the location management network element being a LMF, the base station including a serving base station and one neighbor base station, and the terminal being a UE as an example, the LMF may send a message to each base station to request an aperiodic PRS parameter. The base station returns the aperiodic PRS parameter, and then the aperiodic PRS parameter is further indicated to the UE. As shown in FIG. 4c, the method may include the following steps 4301 to 4305.

In 4301, the LMF sends a third message to the serving base station, where the third message is used to request an aperiodic PRS parameter.

In 4302, the LMF sends a third message to the neighbor base station, where the third message is used to request an aperiodic PRS parameter.

The LMF may indicate to perform PRS flexible trigger through the third message. In other words, the LMF may request a PRS flexible trigger parameter. The serving base station may receive the third message sent by the LMF, and the neighbor base station may receive the third message sent by the LMF.

Optionally, the third message may be NRPPa signaling. That is, the LMF may send the NRPPa signaling to respective base stations to request the corresponding base stations for the aperiodic PRS parameters, respectively.

It can be understood that an execution order of the step 4301 and the step 4302 is not limited. For example, the step 4302 may be executed first, and then the step 4301 may be executed. Alternatively, the step 4301 and the step 4302 may be executed simultaneously, which is not limited in the present disclosure.

In 4303, the serving base station sends a request response message to the LMF, where the request response message includes PRS parameter 1.

In 4304, the neighbor base station sends a request response message to the LMF, where the request response message includes PRS parameter 2.

The LMF may receive PRS parameter 1 sent by the serving base station and PRS parameter 2 sent by the neighbor base station. PRS parameter 1 and PRS parameter 2 are the above-mentioned first PRS parameter. PRS parameter 1 and PRS parameter 2 are aperiodic PRS parameters.

Further optionally, PRS parameters corresponding to different base stations may be the same or different. For example, PRS parameter 1 and the PRS parameter are different.

It can be understood that an execution order of the step 4302 and the step 4303 is not limited. For example, the step 4303 may be executed first, and then the step 4302 may be executed, which is not limited in the present disclosure.

In 4305, the LMF indicates PRS parameter 1 and PRS parameter 2 to the UE.

Optionally, the LMF may indicate PRS parameter 1 and PRS parameter 2 to the UE, respectively, or may indicate PRS parameter 1 and PRS parameter 2 to the UE through a message after obtaining PRS parameter 1 and PRS parameter 2. The LMF may indicate PRS parameter 1 and/or PRS parameter 2 by sending a PRS indication message to the UE. For the way how the LMF indicates the PRS parameter to the UE, reference may be made to the relevant descriptions in the foregoing embodiments, and details are not described here.

Optionally, the serving base station may send the PRS based on PRS parameter 1, and the neighbor base station may send the PRS based on PRS parameter 2, so as to realize positioning based on the PRS.

In an embodiment, the LMF may send a message to each base station to request the aperiodic PRS parameter, the base station returns the aperiodic PRS parameter, and then the aperiodic PRS parameter is indicated to the UE to facilitate the terminal to receive the PRS based on the aperiodic PRS parameter, so as to realize positioning. Thus, the sending of the PRS may be triggered on demand, thereby improving the resource utilization, improving the positioning flexibility, and facilitating to reduce the network power consumption.

Figure 5:
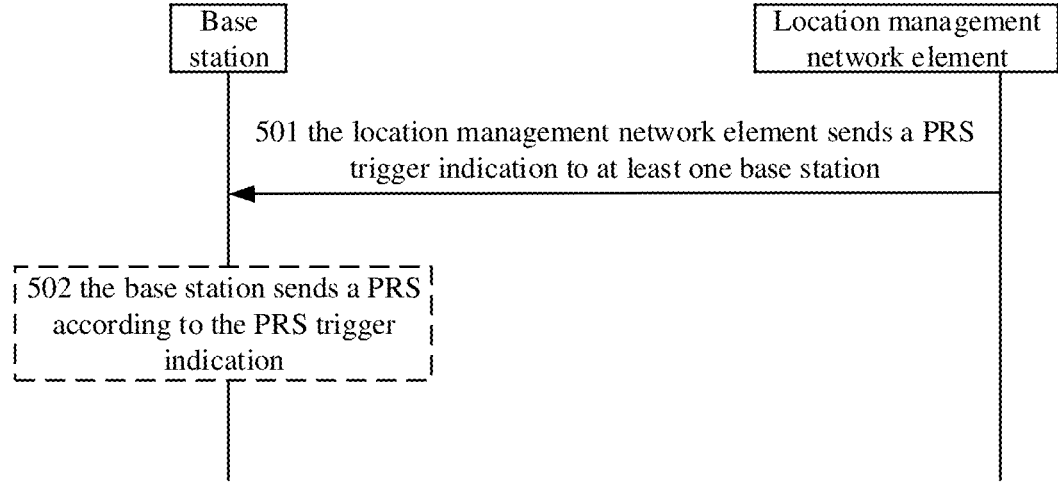
FIG. 5 is a schematic interactive diagram of still another information transmission method provided by an embodiment of the present disclosure.

Referring to FIG. 5, FIG. 5 is a schematic interactive diagram of still another information transmission method provided by an embodiment of the present disclosure. The method in an embodiment may be applied to the above-mentioned communication system. As shown in FIG. 5, the method may include the following steps 501 to 502.

In 501, the location management network element sends a PRS trigger indication to at least one base station.

The PRS trigger indication may be used to instruct the base station to send a PRS, or the PRS trigger indication may be used to trigger sending of the PRS, or the PRS trigger indication may be used to trigger the base station to send the PRS. Optionally, the PRS may be a PRS sent aperiodically.

Optionally, the PRS trigger indication may include one or more of the following: a PRS resource type, PRS spatial relationship information, and PRS resource configuration information. For example, the PRS resource type may include a periodic PRS, a semi-static PRS or an aperiodic PRS. The PRS spatial relationship information may include beam information of the UE, which may include, for example, one or more of the following: an index (such as SSB-index serving) of a synchronization signal and physical broadcast channel block of a serving cell (serving base station), an index (SSB-index) of a synchronization signal and physical broadcast channel block of a neighboring cell (neighbor base station), a reference signal index of channel state information (channel state reference signal resource index serving, csi-RS-index serving), a reference signal index of non-zero power channel state information (non-zero power channel state reference signal resource Id, NZP-CSI-RS-resource Id), a channel sounding reference signal resource identity (SRS-resource Id), and a channel sounding reference signal positioning resource identity (SRS-positioning resource Id). The PRS resource configuration information may include one or more of the following: period information for sending the PRS, a frequency domain position, a resource sending combo, a sending cyclic shift, a sending resource starting position, the number of symbols occupied by a resource, a repetition factor, etc.

In 502, the base station sends the PRS according to the PRS trigger indication.

Optionally, the base station may receive the PRS trigger indication sent by the location management network element, and then may send the PRS according to the PRS trigger indication. Further optionally, the sending of the PRS may be immediate. For example, the PRS may be sent immediately after receiving the PRS trigger indication. Alternatively, the base station may also send the PRS in combination with a set rule. For example, after receiving the PRS trigger indication, the base station sends the PRS after waiting for a preset time (e.g., 10 seconds).

It can be understood that, in some embodiments, after receiving the PRS trigger indication, the base station may not send the PRS. For example, if the base station detects that a time interval from the time for sending the periodic PRS is less than a time threshold (such as 5 seconds), it may ignore the PRS trigger indication, and does not send the PRS until the time for sending the periodic PRS arrives. Thus, the system overhead is saved.

Optionally, when sending the PRS, the base station may send one PRS, or may send a plurality of (two or more) PRSs. PRS parameters corresponding to the plurality of PRSs may be the same or different.

In a possible implementation, the terminal may send a PRS trigger request to the location management network element, and the location management network element may also receive the PRS trigger request from the terminal. The PRS trigger request may be used for requesting to send a PRS. As such, the location management network element may send the PRS trigger indication to the at least one base station according to the PRS trigger request. For example, after receiving the PRS trigger request, the location management network element may send the PRS trigger indication to the at least one base station. Optionally, the terminal may report the PRS trigger request when there is a positioning demand, or the terminal may report the PRS trigger request when detecting that the periodic PRS quality is poor (e.g., the periodic PRS quality is lower than a quality threshold), etc., which are not limited in the present disclosure.

In a possible implementation, the location management network element may also receive a PRS trigger request from the base station. The location management network element may send the PRS trigger indication to the at least one base station according to the PRS trigger request. Optionally, the base station may be a serving base station, and the PRS trigger request may be sent by the terminal to the serving base station, and then sent by the serving base station to the location management network element. Alternatively, the PRS trigger request may be initiated by the base station. That is, the PRS trigger request is directly sent by the base station to the location management network element, which is not limited in the present disclosure.

Optionally, the PRS trigger request may include one or more of the following: a PRS resource type, PRS spatial relationship information, and PRS resource configuration information. For the descriptions of the PRS resource type, the PRS spatial relationship information, and the PRS resource configuration information, reference may be made to the foregoing description, which will not be repeated here.

In a possible implementation, the at least one base station does not include the serving base station. For example, the serving base station may receive the PRS trigger request of the terminal, and then directly send the PRS according to the PRS trigger request. The location management network element may send the PRS trigger indication to the remaining base stations such as neighbor base stations for triggering the neighbor base stations to send the PRS, instead of sending the PRS trigger indication to the serving base station. For another example, the serving base station may receive the PRS trigger request of the terminal and send the PRS according to the PRS trigger request. The location management network element may still send the PRS trigger indication to all base stations including the serving base station (such as serving base station and neighbor base station), and other base stations except for the serving base station may send the PRS after receiving the PRS trigger indication, while the serving base station may not send the PRS if it has already sent the PRS according to the PRS trigger request.

In a possible implementation, after sending the PRS, the base station may reply with a response message to the location management network element to indicate sending of the PRS.

In a possible implementation, the location management network element may also send a notification message to the terminal, and the terminal may receive the notification message from the location management network element. The notification message may be used to indicate sending of the PRS. For example, the location management network element may send the notification message to the terminal after receiving the response message replied by the base station, so that the terminal may receive the PRS in time, thereby facilitating to improve the reliability in PRS reception. Optionally, the notification message may carry the aperiodic PRS parameter. For example, the aperiodic PRS parameter may be part or all of parameters carried in the PRS trigger indication or the PRS trigger request. Alternatively, the aperiodic PRS parameter may be determined in other ways. For details, reference may be made to the relevant description according to embodiments of the present disclosure, which will not be repeated here.

In a possible embodiment, the base station may also send the periodic PRS according to the periodic PRS parameter, and the terminal may respectively receive the aperiodic PRS triggered by the location management network element and the periodic PRS, so that the terminal may realize positioning based on the periodic PRS and the aperiodic PRS. The periodic PRS parameter is different from the aperiodic PRS parameter. For example, the periodic PRS parameter is different from a parameter carried by the above-mentioned PRS trigger indication, or the periodic PRS parameter is different from a parameter carried by the above-mentioned PRS trigger request. This may be specifically the resource configuration information, such as the time resource parameter and/or the spatial relationship information, etc., which will not be described in details here. Optionally, the periodic PRS parameter may be sent by the location management network element to the base station, or specified in the protocol, or negotiated between the base station and the location management network element, or determined in other ways, which are not limited in the present disclosure.

In an embodiment, the location management network element may flexibly trigger the base station to send the PRS by sending the PRS trigger indication to the at least one base station, so as to realize positioning based on the PRS. Thus, the sending of the PRS may be flexibly triggered on demand, thereby improving the resource utilization and improving the positioning flexibility.

With reference to FIG. 6, it is a schematic flowchart of an information transmission method provided by an embodiment of the present disclosure. The method in an embodiment may be applied to the above-mentioned communication system, and may be specifically applied to the above-mentioned location management network element. As shown in FIG. 6, the method may include the following steps 601 to 602.

In 601, the base station receives a PRS trigger message.

The PRS trigger message may be used to trigger sending of a PRS, or the PRS trigger message may be used to instruct the base station to send the PRS, or the PRS trigger indication may be used to trigger the base station to send the PRS. Optionally, the PRS may be a PRS sent aperiodically, that is, an aperiodic PRS.

In 602, the base station sends the PRS according to the PRS trigger message.

Optionally, when sending the PRS, the base station may send one PRS, or may send a plurality of (two or more) PRSs. PRS parameters corresponding to the plurality of PRSs may be the same or different, which is not limited in the present disclosure.

In a possible implementation, the PRS trigger message may be a PRS trigger indication. For example, the base station may receive the PRS trigger indication from the location management network element, and then send the PRS according to the PRS trigger indication. For details, reference may be made to the relevant description according to the embodiment shown in FIG. 5, which is not repeated here.

In a possible implementation, the PRS trigger message may be a PRS trigger request. For example, the base station may send the PRS trigger request to the location management network element, and the base station may receive the PRS trigger request from the terminal. For example, the terminal may send the PRS trigger request to the base station, and the base station may receive the PRS trigger request from the terminal, and then send the PRS according to the PRS trigger request.

In a possible implementation, the PRS trigger message may include the PRS trigger indication and the PRS trigger request. For example, the terminal may send the PRS trigger request to the base station, the base station may receive the PRS trigger request from the terminal, and send it to the location management network element. The location management network element may send the PRS trigger indication to the base station, and then sends the PRS according to the PRS trigger indication.

In a possible embodiment, the base station may also send the periodic PRS according to the periodic PRS parameter, and the terminal may respectively receive the aperiodic PRS triggered by the location management network element and the periodic PRS to realize positioning based on the periodic PRS and the aperiodic PRS, which will not be repeated here.

In an embodiment, the base station may send the PRS according to the received PRS trigger message, so as to realize the flexible triggering of the base station to send the PRS, thereby realizing positioning based on the PRS. Thus, the sending of the PRS may be flexibly triggered on demand, thereby improving the resource utilization and improving the positioning flexibility.

In combination with FIGS. 5 and 6, with further reference to FIG. 7*a*, it is a schematic interactive diagram of still another information transmission method provided by an embodiment of the present disclosure. In an embodiment, taking the location management network element being a LMF, the base station including a serving base station and one neighbor base station, and the terminal being a UE as an example, the UE may send a PRS trigger request to the LMF, so that the LMF sends the PRS trigger indication to each base station for triggering the base station to send the PRS. As shown in FIG. 7*a*, the method may include the following steps 7101 to 7105.

In 7101, the UE sends the PRS trigger request to the LMF.

In a possible implementation, the UE may directly send the PRS trigger request to the LMF. Alternatively, the UE may also send the PRS trigger request to the base station such as the serving base station, and the serving base station sends the PRS trigger request to the LMF. The LMF may receive the PRS trigger request sent by the UE, or may receive the PRS trigger request sent by the base station such as the serving base station.

Optionally, the PRS trigger request may include one or more of the following: a PRS resource type, PRS spatial relationship information, and PRS resource configuration information. For example, in a scenario where the UE directly sends the PRS trigger request to the LMF, the above-mentioned information may be carried in the PRS trigger request. For another example, in a scenario where the UE sends the PRS trigger request to the base station, and the base station sends the PRS trigger request to the LMF, the above-mentioned information may be carried in both the PRS trigger request sent by the UE to the base station and the PRS trigger request sent by the base station to the LMF. Or, the above-mentioned information may be only carried in the PRS trigger request sent by the base station to the LMF, and so on, which is not limited in the present disclosure. For the descriptions of the PRS resource type, the PRS spatial relationship information, and the PRS resource configuration information, reference may be made to the relevant descriptions in the foregoing embodiments, which are not repeated here.

In a possible implementation, the terminal may send the PRS trigger request when there is a positioning demand. Alternatively, the terminal may send the PRS trigger request when detecting that the periodic PRS quality is poor (e.g., the periodic PRS quality is lower than a quality threshold).

In 7102, the LMF sends a PRS trigger indication to the serving base station.

In 7103, the LMF sends a PRS trigger indication to the neighbor base station.

After receiving the PRS trigger request, the LMF may send the PRS trigger indication to each base station corresponding to the UE. For example, the PRS trigger indication may be NRPPa signaling, and the LMF may send the NRPPa signaling to the respective base stations for instructing the corresponding base stations to send the PRSs, respectively.

Optionally, the PRS trigger indication may include one or more of the following: a PRS resource type, PRS spatial relationship information, PRS resource configuration information, etc., which are not repeated here. It can be understood that parameters carried by the PRS trigger indications sent by the LMF to the respective base stations may be different. For example, information carried by the PRS trigger indication sent to the serving base station is different from information carried by the PRS trigger indication sent to the neighbor base station. For example, the PRS resource configuration information for the PRS trigger indication sent to the serving base station and the PRS trigger indication sent to the neighbor base station.

In a possible implementation, after receiving the PRS trigger indication, the base station may also reply a response message to the LMF. For example, the serving base station sends the response message to the LMF, and the neighbor base station sends the response message to the LMF.

It can be understood that an execution order of the step 7102 and the step 7103 is not limited. For example, the step 7103 may be executed first, and then the step 7102 may be executed. Alternatively, the step 7102 and the step 7103 may be executed simultaneously, which is not limited in the present disclosure.

In 7104, the serving base station sends the PRS.

In 7105, the neighbor base station sends the PRS.

Optionally, after receiving the PRS trigger indication, the serving base station may send the PRS. After receiving the PRS trigger indication, the neighbor base station may send the PRS. The PRS may be an aperiodic PRS.

In a possible implementation, if the UE reports the PRS trigger request through the serving base station, the LMF may no longer send the PRS trigger indication to the serving base station, but only send the PRS trigger indication to the remaining base stations such as the neighbor base station, for triggering the neighbor base station to send the PRS. The serving base station may directly send the PRS according to the PRS trigger request from the UE.

In a possible implementation, when the base station sends the PRS, it may send a preset PRS, and it may also determine the PRS according to information carried in the PRS trigger indication and then send the PRS, which are not limited in the present disclosure. For example, the serving base station and the neighbor base station may respectively determine the PRS based on the information carried in the PRS trigger indication received by themselves, and send the PRS.

Optionally, the LMF may send one PRS trigger indication to each base station, or may send a plurality of PRS trigger indications. A parameter carried by each PRS trigger indication may be different. Then, the base station may send one or more PRSs according to the PRS trigger indication sent by the LMF. For example, if the LMF sends one PRS trigger indication to the serving base station, the serving base station may send one PRS according to the PRS trigger indication. For example, if the LMF sends a plurality of PRS trigger indications to the neighbor base station, the neighbor base station may send one or more PRSs according to the plurality of PRS trigger indications.

In a possible implementation, after sending the PRSs, the serving base station and the neighbor base station may reply the response messages to the LMF to indicate sending of the PRSs.

It can be understood that an execution order of the step 7103 and the step 7104 is not limited. For example, the step 7104 may be executed first, and then the step 7103 may be executed, which is not limited in the present disclosure.

In an embodiment, the UE may send the PRS trigger request to the LMF, so that the LMF sends the PRS trigger indication to each base station for triggering the base station to send the PRS, so as to realize positioning based on the PRS. Thus, sending of the PRS may be flexibly triggered on demand, which improves the resource utilization and improves the positioning flexibility.

Figure 7B:
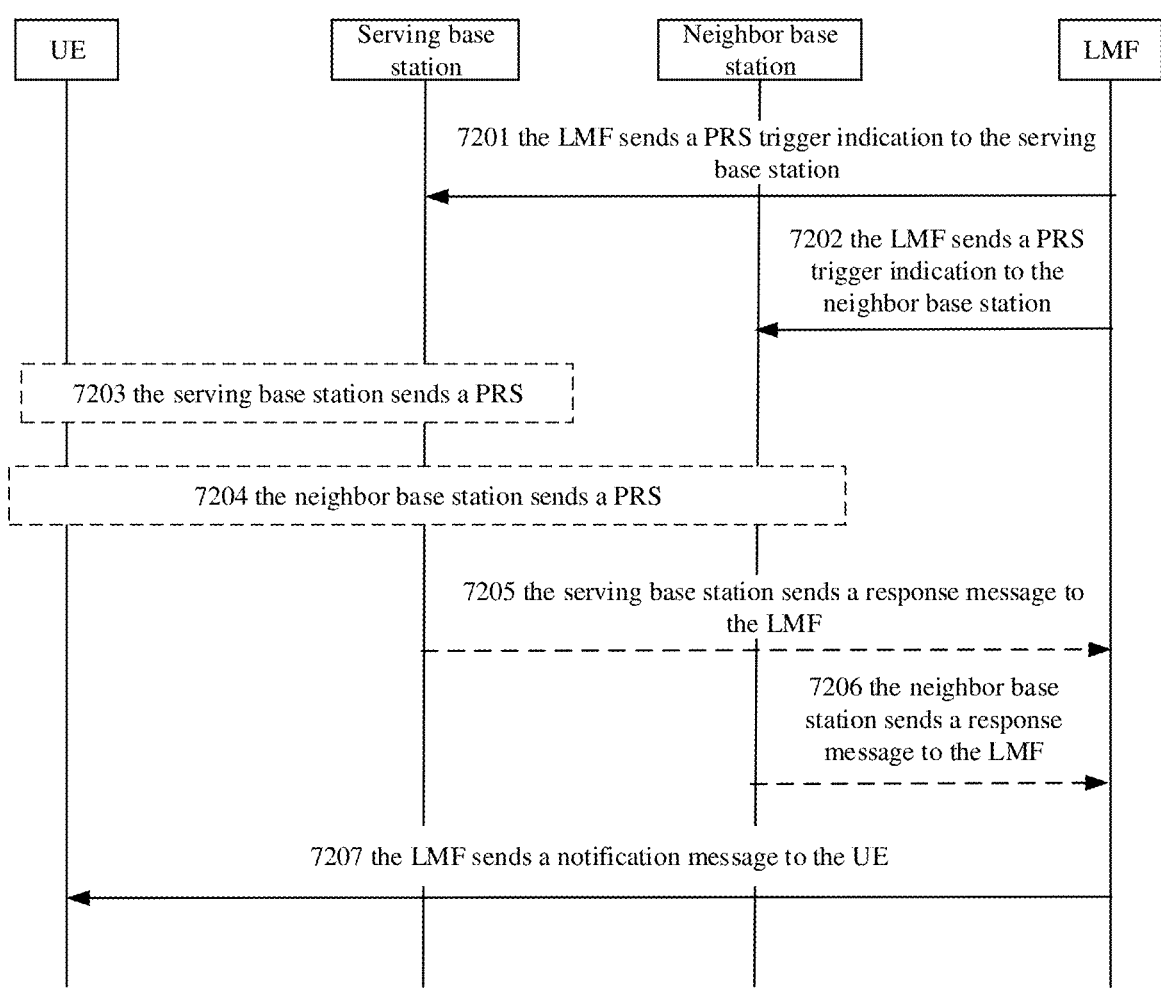
FIG. 7b is a schematic interactive diagram of still another information transmission method provided by an embodiment of the present disclosure.

With reference to FIG. 7a, it is a schematic interactive diagram of still another information transmission method provided by an embodiment of the present disclosure. In an embodiment, taking the location management network element being a LMF, the base station including a serving base station and one neighbor base station, and the terminal being a UE as an example, the LMF may send a PRS trigger indication to each base station for instructing the base station to send a PRS, and may send a notification message to the UE to inform the UE of the sending of the PRS. As shown in FIG. 7b, the method may include the following steps 7201 to 7207.

In 7201, the LMF sends the PRS trigger indication to the serving base station.

In 7202, the LMF sends the PRS trigger indication to the neighbor base station.

The LMF may respectively send PRS trigger indications to respective base stations for instructing the respective base stations to send PRSs. Optionally, the LMF may send the trigger indication to each base station when the UE has a positioning demand. For example, the LMF may send the trigger indication to each base station when receiving a UE location obtaining request sent by a third party.

Optionally, the PRS trigger indication may include one or more of the following: a PRS resource type, PRS spatial relationship information, PRS resource configuration information, etc., which are not repeated herein.

Further optionally, the LMF may send one PRS trigger indication to each base station, or may send a plurality of PRS trigger indications, which will not be repeated here.

It can be understood that an execution order of the step 7201 and the step 7202 is not limited. For example, the step 7202 may be executed first, and then the step 7201 may be executed. Alternatively, the step 7201 and the step 7202 may be executed simultaneously, which is not limited in the present disclosure.

In 7203, the serving base station sends the PRS.

In 7204, the neighbor base station sends the PRS.

Optionally, after receiving the PRS trigger indication, the serving base station may send the PRS. After receiving the PRS trigger indication, the neighbor base station may send the PRS. The PRS may be an aperiodic PRS.

In a possible implementation, when the base station sends the PRS, it may send a preset PRS, and it may also determine the PRS according to information carried in the PRS trigger indication and then send the PRS, which will not be repeated here.

In 7205, the serving base station sends a response message to the LMF.

In 7206, the neighbor base station sends a response message to the LMF.

Optionally, after sending the PRSs, the serving base station and the neighbor base station may reply the response messages to the LMF to indicate sending of the PRSs. Alternatively, the serving base station and the neighbor base station may reply the response messages to the LMF after receiving the PRS trigger indication.

It can be understood that magnitudes of sequence numbers of the above processes do not mean to limit the execution sequence. For example, the step 7203 may be performed first, and then the step 7202 may be performed.

For another example, the step 7205 may be performed first, and then the step 7203 may be performed, etc., which are not listed here one by one.

In 7207, the LMF sends a notification message to the UE.

For example, the PRS trigger indication sent by the LMF to the serving base station is on-demand PRS trigger for serving, the first message sent to the neighbor base station is on-demand PRS trigger for neighbor, the response message sent by the serving base station to the LMF is on-demand PRS trigger response for serving, the request response message sent by the neighbor base station to the LMF is on-demand PRS trigger response for neighbor, and the notification message sent by the LMF to the UE is on-demand PRS indication.

For example, the serving base station may send the notification message to the UE after sending the PRS trigger indications to the serving base station and the neighbor base station. For another example, the LMF may send the notification message to the UE after receiving the response messages replied by the serving base station and the neighbor base station to indicate the sending of the PRS. This helps to facilitate the UE to receive the PRS in time, thereby facilitating to improve the reliability for the PRS reception.

In an embodiment, the LMF may send the PRS trigger indication to each base station for instructing the base station to send the PRS. Also, the LMF may send the notification message to the UE to notify the UE of the sending of the PRS, after receiving the response message replied by the base station. This helps to facilitate the UE to receive the PRS in time and realize positioning based on the PRS, so that the sending of the PRS may be flexibly triggered on demand. Thus, the resource utilization is improved, the positioning flexibility is improved, and the system power consumption is reduced.

It can be understood that the solutions shown in FIG. 5 to FIG. 7b may also be combined with the solutions shown in FIG. 2 to FIG. 4c. For example, the location management network element may send the PRS trigger indication to the at least one base station after obtaining the first PRS parameter, for triggering the base station to send the PRS according to the first PRS parameter, etc., which are not repeated here.

It can be understood that the above method embodiments are all examples of the information transmission method according to embodiments of the present disclosure, and the description of each embodiment has its own focus. For those not described in detail in an embodiment, reference may be made to the relevant descriptions in other embodiments.

Figure 8:
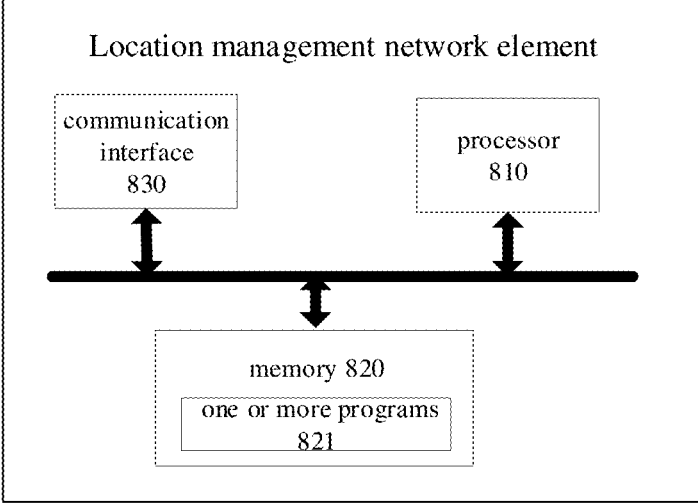
FIG. 8 is a schematic structural diagram of a location management network element provided by an embodiment of the present disclosure.

Referring to FIG. 8, it is a schematic structural diagram of a location management network element provided by an embodiment of the present disclosure. As shown in FIG. 8, the location management network element 800 may include: a processor 810, a memory 820, a communication interface 830, and one or more programs 821. The one or more programs 821 may be stored in the memory 820, and configured to be executed by the processor 810. For example, the one or more programs may include instructions configured for performing the following steps:

obtaining a first Positioning Reference Signal (PRS) parameter, where the first PRS parameter is a parameter for a PRS sent aperiodically; and sending the first PRS parameter to a terminal through the communication interface 830.

Optionally, the one or more programs may further include instructions configured for performing the following step:

sending a first message to a base station through the communication interface 830, where the first message includes a second PRS parameter.

When obtaining the first PRS message, instructions in the one or more programs are specifically configured to perform the following operation:
receiving the first PRS parameter sent by the base station through the communication interface 830.

Optionally, the one or more programs may further include instructions configured for performing the following steps:
sending a second message to a base station through the communication interface 830, where the second message includes the first PRS parameter; and
receiving a confirmation message sent by the base station through the communication interface 830.

Optionally, the one or more programs may further include instructions configured for performing the following step:
sending a third message to the base station through the communication interface 830, where the third message is used to request the first PRS parameter.

When obtaining the first PRS parameter, instructions in the one or more programs may be specifically configured to perform the following operation:
receiving the first PRS parameter sent by the base station through the communication interface 830.

Optionally, the first PRS parameter is different from a parameter for a PRS sent periodically.

Optionally, the first PRS parameter includes one or more of the following parameters: a frequency resource parameter for the PRS and a time resource parameter for the PRS, where the time resource parameter for the PRS includes an effective time for the PRS.

Alternatively, or additionally, the one or more programs may further include instructions configured for performing the following step:
sending a Positioning Reference Signal (PRS) trigger indication to at least one base station, where the PRS trigger indication is used to instruct a base station to send a PRS.

Optionally, the one or more programs may further include instructions configured for performing the following step:
receiving a PRS trigger request from a terminal through the communication interface 830, where the PRS trigger request is used for requesting to send a PRS.

When sending the PRS trigger indication to the at least one base station, instructions in the one or more programs may be specifically configured to perform the following operation:
sending the PRS trigger indication to the at least one base station through the communication interface 830 according to the PRS trigger request.

Optionally, the one or more programs may further include instructions configured for performing the following step:
receiving a PRS trigger request sent by a base station through the communication interface 830.

When sending the PRS trigger indication to the at least one base station, instructions in the one or more programs may be specifically configured to perform the following operation:
sending the PRS trigger indication to the at least one base station through the communication interface 830 according to the PRS trigger request.

Optionally, the base station is a serving base station of a terminal, and the PRS trigger request is sent by the terminal to the serving base station.

Optionally, the at least one base station does not include the serving base station.

Optionally, the PRS trigger request includes one or more of the following: a PRS resource type, PRS spatial relationship information, and PRS resource configuration information.

Optionally, the PRS trigger indication includes one or more of the following: a PRS resource type, PRS spatial relationship information, and PRS resource configuration information.

Optionally, the one or more programs may further include instructions configured for performing the following step:
sending a notification message to a terminal through the communication interface 830, where the notification message is used to indicate, to the terminal, the sending of the PRS.

Optionally, the one or more programs may further include instructions configured for performing the following step:
receiving a response message sent by the at least one base station through the communication interface 830, where the response message is used to indicate the sending of the PRS.

When sending the notification message to the terminal, instructions in the one or more programs may be specifically configured to perform the following operation: sending the notification message to the terminal through the communication interface 830 according to the response message.

Optionally, the PRS is a PRS sent aperiodically.

Optionally, the PRS sent aperiodically is different from a PRS sent periodically.

Figure 9:
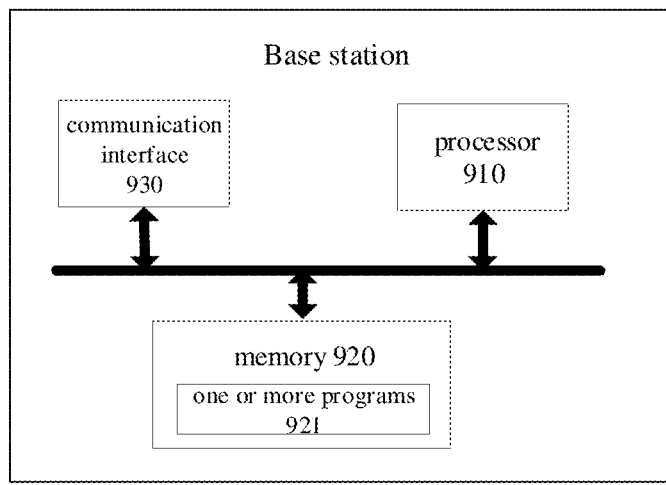
FIG. 9 is a schematic structural diagram of a base station provided by an embodiment of the present disclosure.

Referring to FIG. 9, it is a schematic structural diagram of a base station provided by an embodiment of the present disclosure. As shown in FIG. 9, the base station 900 may include: a processor 910, a memory 920, a communication interface 930, and one or more programs 921. The one or more programs 921 may be stored in the memory 920, and configured to be executed by the processor 910. For example, the one or more programs may include instructions configured for performing the following steps:
receiving a request message from a location management network element through the communication interface 930, where the request message is used to request a first PRS parameter, and the first PRS parameter is a parameter for a PRS sent aperiodically; and sending a request response message through the communication interface 930 to the location management network element according to the request message, where the request response message is used to indicate the first PRS parameter.

Optionally, the request message is a first message, and the first message includes a second PRS parameter. When sending the request response message to the location management network element according to the request message, instructions in the one or more programs may be specifically configured to perform the following operation: sending the request response message through the communication interface 930 to the location management network element according to the first message, where the request response message includes the first PRS parameter.

Optionally, the request message is a second message, the second message includes the first PRS parameter, and the request response message is a confirmation message.

Optionally, the request message is a third message. When sending the request response message to the location management network element according to the request message, instructions in the one or more programs may be specifically configured to perform the following operation:
sending the request response message through the communication interface 930 to the location management network element according to the third message, where the request response message includes the first PRS parameter.

Optionally, the first PRS parameter is different from a parameter for a PRS sent periodically.

Optionally, the first PRS parameter includes one or more of the following parameters: a frequency resource parameter for the PRS and a time resource parameter for the PRS, where the time resource parameter for the PRS includes an effective time for the PRS.

Alternatively, or additionally, the one or more programs may further include instructions configured for performing the following steps:

receiving a Positioning Reference Signal (PRS) trigger message through the communication interface 930, where the PRS trigger message is used to trigger sending of a PRS; and sending the PRS through the communication interface 930 according to the PRS trigger message.

Optionally, the PRS trigger message is a PRS trigger indication. When receiving the PRS trigger message, instructions in the one or more programs may be specifically configured to perform the following operation:

receiving a PRS trigger indication from a location management network element through the communication interface 930.

Optionally, the PRS trigger message is a PRS trigger request, and the base station is a serving base station of a terminal.

When receiving the PRS trigger message, instructions in the one or more programs may be specifically configured to perform the following operation:

receiving the PRS trigger request from the terminal through the communication interface 930.

Optionally, the one or more programs may further include instructions configured for performing the following step:

sending a response message to the location management network element through the communication interface 930, where the response message is used to indicate sending of the PRS.

Optionally, the PRS is a PRS sent aperiodically.

Optionally, the PRS sent aperiodically is different from the PRS sent periodically.

Optionally, the PRS trigger message includes one or more of the following: a PRS resource type, PRS spatial relationship information, and PRS resource configuration information.

Figure 10:
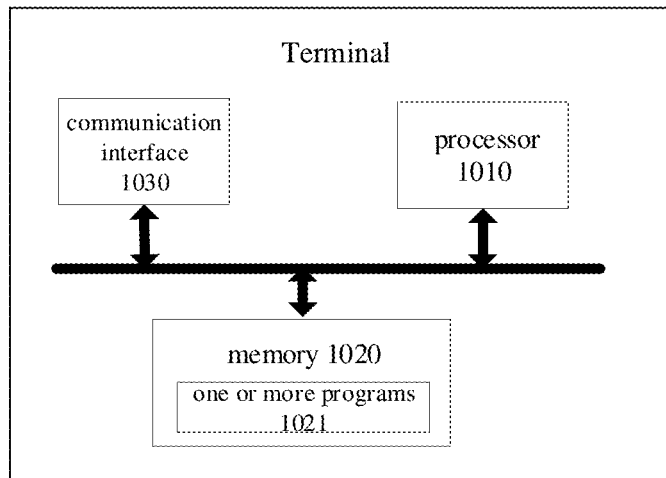
FIG. 10 is a schematic structural diagram of a terminal provided by an embodiment of the present disclosure.

Referring to FIG. 10, it is a schematic structural diagram of a terminal provided by an embodiment of the present disclosure. As shown in FIG. 10, the terminal 1000 may include: a processor 1010, a memory 1020, a communication interface 1030, and one or more programs 1021. The one or more programs 1021 may be stored in the memory 1020, and configured to be executed by the processor 1010. For example, the one or more programs may include instructions configured for performing the following step:

receiving a first PRS parameter from a location management network element through the communication interface 1030, where the first PRS parameter is a parameter for a PRS sent aperiodically.

Optionally, the first PRS parameter is different from a parameter for a PRS sent periodically.

Optionally, the first PRS parameter includes one or more of the following parameters: a frequency resource parameter for the PRS and a time resource parameter for the PRS, where the time resource parameter for the PRS includes an effective time for the PRS.

Alternatively, or additionally, the one or more programs may further include instructions configured for performing the following step:

sending a Positioning Reference Signal (PRS) trigger request to a location management network element through the communication interface 1030, where the PRS trigger request is used for requesting to send a PRS.

Optionally, the PRS is a PRS sent aperiodically.

Optionally, the PRS sent aperiodically is different from the PRS sent periodically.

Optionally, the PRS trigger request includes one or more of the following: a PRS resource type, PRS spatial relationship information, and PRS resource configuration information.

Alternatively, or additionally, the one or more programs may further include instructions configured for performing the following step:

receiving a notification message from a location management network element through the communication interface 1030, where the notification message is used to indicate sending of a PRS.

Optionally, the PRS is a PRS sent aperiodically.

Optionally, the PRS sent aperiodically is different from the PRS sent periodically.

Optionally, the PRS trigger request includes one or more of the following: a PRS resource type, PRS spatial relationship information, and PRS resource configuration information.

In an embodiment of the present disclosure, the processor may be a Central Processing Unit (CPU), a general-purpose processor, a Digital Signal Processor (DSP), an Application-Specific Integrated Circuit (ASIC), a Field Programmable Gate Array (FPGA), other programmable logic devices, transistor logic devices, hardware components, or a combination thereof. The processor may also be a combination for implementing computing functions, for example, including a combination of one or more microprocessors, a combination of DSP and microprocessor, or the like. The communication interface may include a receiver and a transmitter that are independent to each other, so as to receive a signal through the receiver and transmit a signal through the transmitter. Alternatively, the receiver and the transmitter may be integrated to receive and transmit signals through a communication interface, which are not limited in the present disclosure. It can be understood that the processor may be configured to control and manage actions of devices such as a core network element, a base station, and a terminal, and the communication interface may perform a communication function to support communications with other devices.

The technical solutions according to embodiments of the present disclosure have been introduced above from the perspective of interactions between various network elements. It can be understood that, in order to implement the above functions, the terminal and the network device include hardware structures and/or software modules for performing respective functions. Division of functional units of the location management network element, the base station and the terminal may be implemented according to the above method examples in embodiments of the present disclosure. For example, various functional units may be in one-to-one correspondence with each function, or two or more functions may be integrated into one processing unit. The integrated unit may be implemented in the form of hardware, or may be implemented in the form of software program module. It is to be noted that, division of units in embodiments of the present disclosure is illustrative and is only a division of logical functions, and other ways of division may be available in practice.

Figure 11:
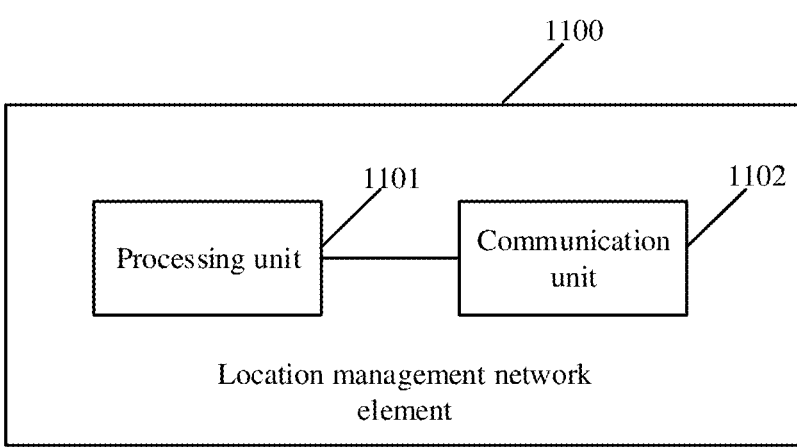
FIG. 11 is a schematic structural diagram of another location management network element provided by an embodiment of the present disclosure.

Referring to FIG. 11, FIG. 11 shows another possible schematic structural diagram of a location management network element involved in the foregoing embodiments. As shown in FIG. 11, the location management network element 1100 may include: a processing unit 1101 and a communication unit 1102. These units may perform the corresponding functions of the terminal in the above method examples. For example, the processing unit 1101 may be configured to control and manage actions of the location management network element. The communication unit 1102 may be configured to support communications between the location management network element and other devices, for example, communications with the terminal and the base station. Optionally, the location management network element may further include a storage unit 1103 configured to store program codes and data of the network device.

The processing unit 1101 may be a processor or a controller. It may be, for example, a Central Processing Unit (CPU), a general-purpose processor, a Digital Signal Processor (DSP), an Application-Specific Integrated Circuit (ASIC), a Field Programmable Gate Array (FPGA), other programmable logic devices, transistor logic devices, hardware components, or a combination thereof. Various exemplary logic blocks, modules, and circuits disclosed in embodiments of the present disclosure may be implemented or executed. The processor may also be a combination for implementing computing functions, for example, a combination of one or more microprocessors, a combination of DSP and microprocessor, or the like. The communication unit 1102 may be a communication interface, a transceiver, a transceiver circuit, a radio frequency chip, etc. The storage unit 1103 may be a memory.

When the processing unit 1101 is a processor, the communication unit 1102 is a communication interface, and the storage unit 1103 is a memory, the location management network element involved in embodiments of the present disclosure may be the location management network element shown in FIG. 8.

Optionally, the location management network element may implement some or all of the steps performed by the location management network element in the methods according to embodiments shown in FIG. 2 to FIG. 7b through the above-mentioned units. It should be understood that embodiments of the present disclosure are device embodiments corresponding to method embodiments, and the descriptions of method embodiments are also applicable to embodiments of the present disclosure, which are not repeated herein.

Figure 12:
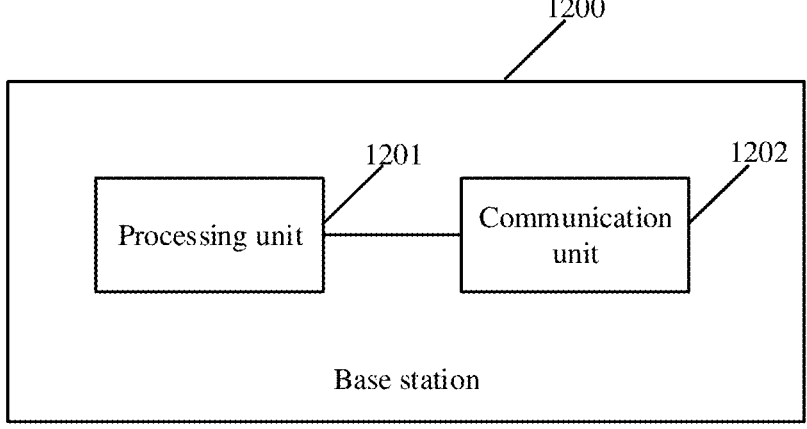
FIG. 12 is a schematic structural diagram of another base station provided by an embodiment of the present disclosure.

Referring to FIG. 12, FIG. 12 shows another possible schematic structural diagram of a base station involved in the foregoing embodiments. As shown in FIG. 12, the base station 1200 may include: a processing unit 1201 and a communication unit 1202. These units may perform the corresponding functions of the base station in the above method examples. For example, the processing unit 1201 may be configured to control and manage actions of the base station. The communication unit 1202 may be configured to support communications between the base station and other devices, for example, communications with the terminal and the location management network element. Optionally, the base station may further include a storage unit 1203 configured to store program codes and data of the base station.

The processing unit 1201 may be a processor or a controller, the communication unit 1202 may be a communication interface, a transceiver, a transceiver circuit, a radio frequency chip, and the like, and the storage unit 1203 may be a memory.

When the processing unit 1201 is a processor, the communication unit 1202 is a communication interface, and the storage unit 1203 is a memory, the base station involved in embodiments of the present disclosure may be the base station shown in FIG. 9.

Optionally, the base station may implement some or all of the steps performed by the base station in the methods according to embodiments shown in FIG. 2 to FIG. 7b through the above-mentioned units. It should be understood that embodiments of the present disclosure are device embodiments corresponding to method embodiments, and the descriptions of method embodiments are also applicable to embodiments of the present disclosure, which are not repeated herein.

Figure 13:
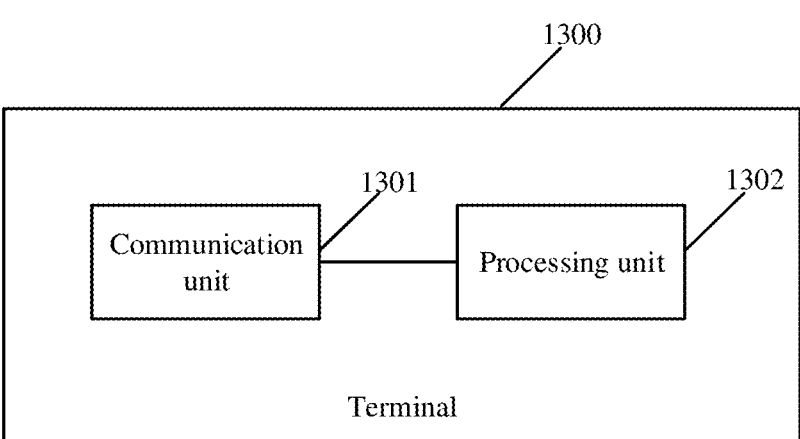
FIG. 13 is a schematic structural diagram of another terminal provided by an embodiment of the present disclosure.

Referring to FIG. 13, FIG. 13 shows another possible schematic structural diagram of a terminal involved in the foregoing embodiments. As shown in FIG. 13, the terminal 1300 may include: a communication unit 1301 and a processing unit 1302. These units may perform the corresponding functions of the terminal such as UE in the above method examples. For example, the processing unit 1302 may be configured to control and manage actions of the terminal. The communication unit 1301 may be configured to support communications between the terminal and other devices, for example, communications with the base station and the location management network element. Optionally, the terminal may further include a storage unit 1303 configured to store program codes and data of the terminal.

The processing unit 1302 may be a processor or a controller, the communication unit 1301 may be a communication interface, a transceiver, a transceiver circuit, a radio frequency chip, and the like, and the storage unit 1303 may be a memory.

When the processing unit 1302 is a processor, the communication unit 1301 is a communication interface, and the storage unit 1303 is a memory, the terminal involved in embodiments of the present disclosure may be the terminal shown in FIG. 10.

Optionally, the terminal may implement some or all of the steps performed by the terminal in the methods according to embodiments shown in FIG. 2 to FIG. 7b through the above-mentioned units. It should be understood that embodiments of the present disclosure are device embodiments corresponding to method embodiments, and the descriptions of method embodiments are also applicable to embodiments of the present disclosure, which are not repeated herein.

The present disclosure further provides a communication system, and the system includes the above-mentioned location management network element, terminal and/or base station. Optionally, the system may further include other devices that interact with the foregoing network elements in the solutions provided by embodiments of the present disclosure. The location management network element, base station and/or terminal may perform some or all of the steps in the methods according to embodiments shown in FIG. 2 to FIG. 7b. For details, reference may be made to the relevant descriptions of the above embodiments, which will not be repeated herein.

Embodiments of the present disclosure further provide a computer-readable storage medium, and the computer-readable storage medium stores a computer program for electronic data interchange. The computer program causes a computer to perform some or all operations performed by the location management network element, the terminal or the base station in the foregoing method embodiments.

Embodiments of the present disclosure further provide a computer program product. The computer program product includes a non-transitory computer readable storage medium storing a computer program. The computer program is operable to cause a computer to perform some or all operations performed by the location management network element, the terminal or the base station in the foregoing method embodiments. For example, the computer program product may be a software installation package.

It can be understood that in various embodiments of the present disclosure, a magnitude of a sequence number of each process does not mean the execution sequence, the execution sequence of each process should be determined according to its function and the internal logic, and an implementation process of embodiments of the present disclosure should not be limited.

Steps of the methods or algorithms described in conjunction with the disclosure of the present disclosure may be implemented by means of hardware, or may be implemented by executing software instructions by a processor. The software instructions may be composed of corresponding software modules, which may be stored in a Random Access Memory (RAM), a flash memory, a Read Only Memory (ROM), an Erasable Programmable ROM (EPROM), an Electrically EPROM (EEPROM), a register, a hard disk, a mobile hard disk, a Compact Disc (CD)-ROM, or any other form of storage medium known in the art. An exemplary storage medium is coupled to a processor, such that the processor can read information from the storage medium and write information to the storage medium. The storage medium may also be a component of the processor. The processor and the storage medium may be located in an ASIC. In addition, the ASIC may be located in a communication device such as the terminal and the network device. The processor and the storage medium may also be present as discrete components in the communication device.

It can be understood that, the "first", "second", and various numerical numbers used herein are merely intended for distinction for the convenience of description, rather than limiting the scope of implementations of the present disclosure. The term "and/or" herein only describes an association relationship between associated objects, which means that there may be three relationships. For example, A and/or B may mean A alone, both A and B exist, and B alone. In addition, the character "/" herein, unless otherwise specified, generally indicates that the associated objects are in an "or" relationship.

Those skilled in the art shall appreciate that, in one or more of the above examples, the functions described in embodiments of the present disclosure may be implemented in whole or in part by software, hardware, firmware, or any other combination thereof. When implemented by software, all or part of the functions may be implemented in the form of a computer program product. The computer program product includes one or more computer instructions. When the computer program instructions are loaded and executed on a computer, all or part of the operations or functions in embodiments of the present disclosure are performed. The computer may be a general-purpose computer, a special-purpose computer, a computer network, or other programmable apparatuses. The computer instructions may be stored in a computer readable storage medium, or transmitted from one computer readable storage medium to another computer readable storage medium. For example, the computer instructions may be transmitted from one website, computer, server, or data center to another website, computer, server, or data center in a wired way or in a wireless way. Examples of the wired way may be a coaxial cable, an optical fiber, a Digital Subscriber Line (DSL), etc. The wireless way may be, for example, infrared, wireless, microwave, etc. The computer readable storage medium may be any computer accessible usable-medium or a data storage device such as a server, a data center, or the like which is integrated with one or more usable media. The usable medium may be a magnetic medium (such as a soft disc, a hard disc, or a magnetic tape), an optical medium (such as a Digital Video Disc (DVD)), or a semiconductor medium (such as a Solid State Disk (SSD)), etc.

What is claimed is:

1. An information transmission method, comprising:
obtaining, by a location management network element, a first Positioning Reference Signal (PRS) parameter, wherein the first PRS parameter is a parameter for a PRS sent aperiodically; and
sending, by the location management network element, the first PRS parameter to a terminal,
wherein the method further comprises:
sending, by the location management network element, a PRS trigger indication to a base station, where the PRS trigger indication is used for triggering sending of the PRS:
wherein the PRS trigger indication comprises PRS spatial relationship information; and
wherein the PRS spatial relationship information comprises one or more of:
an index of a synchronization signal and physical broadcast channel (SS/PBCH) block of a serving cell or a serving base station, or
an index of a synchronization signal and physical broadcast channel (SS/PBCH) block of a neighbor cell or neighbor base station.

2. The method according to claim 1, wherein the method further comprises:
sending, by the location management network element, a first message to a base station, wherein the first message comprises a second PRS parameter; and
the obtaining, by the location management network element, the first PRS parameter comprises:
receiving, by the location management network element, the first PRS parameter sent by the base station.

3. The method according to claim 1, wherein the method further comprises:
sending, by the location management network element, a second message to a base station, wherein the second message comprises the first PRS parameter; and
receiving, by the location management network element, a confirmation message sent by the base station.

4. The method according to claim 1, wherein the method further comprises:
sending, by the location management network element, a third message to a base station, wherein the third message is used for requesting the first PRS parameter; and
the obtaining, by the location management network element, the first PRS parameter comprises:
receiving, by the location management network element, the first PRS parameter sent by the base station.

5. The method according to claim 1, wherein the first PRS parameter is different from a parameter for a PRS sent periodically.

6. The method according to claim 1, wherein the first PRS parameter comprises a frequency resource parameter for the PRS and a time resource parameter for the PRS, where the time resource parameter for the PRS comprises an effective time for the PRS.

7. A location management network element, comprising: a processor, a memory, a communication interface, and one or more programs, wherein:

the one or more programs is stored in the memory and configured to be executed by the processor, and the one or more programs comprises instructions configured for performing steps in the method according to claim 1.

8. An information transmission method, comprising:

receiving, by a base station, a request message from a location management network element, wherein the request message is used for requesting a first Positioning Reference Signal (PRS) parameter, and the first PRS parameter is a parameter for a PRS sent aperiodically; and sending, by the base station, a request response message to the location management network element according to the request message, wherein the request response message is used for indicating the first PRS parameter, wherein the method further comprises:

receiving, by the base station, a PRS trigger indication from the location management network element, where the PRS trigger indication is used for triggering sending of the PRS, and sending, by the base station, the PRS according to the PRS trigger indication, wherein the PRS trigger indication comprises PRS spatial relationship information; and wherein the PRS spatial relationship information comprises one or more of:

an index of a synchronization signal and physical broadcast channel (SS/PBCH) block of a serving cell or a serving base station, or an index of a synchronization signal and physical broadcast channel (SS/PBCH) block of a neighbor cell or neighbor base station.

9. The information transmission method according to claim 8, wherein the parameter for the PRS sent aperiodically is a PRS flexible trigger parameter.

10. The method according to claim 8, wherein:

the request message is a first message, and the first message comprises a second PRS parameter; and the sending, by the base station, the request response message to the location management network element according to the request message comprises:

sending, by the base station, the request response message to the location management network element according to the first message, wherein the request response message comprises the first PRS parameter.

11. The method according to claim 8, wherein:

the request message is a third message, and the sending, by the base station, the request response message to the location management network element according to the request message comprises:

sending, by the base station, the request response message to the location management network element according to the third message, wherein the request response message comprises the first PRS parameter.

12. The method according to claim 8, wherein the first PRS parameter is different from a parameter for a PRS sent periodically.

13. The method according to claim 8, wherein the first PRS parameter comprises a frequency resource parameter for the PRS and a time resource parameter for the PRS, where the time resource parameter for the PRS comprises an effective time for the PRS.

14. The method according to claim 13, wherein the effective time for the PRS comprises a start time and an effective duration of the PRS.

15. The method according to claim 13, wherein the frequency resource parameter for the PRS and the time resource parameter for the PRS comprise a resource sending comb.

16. A base station, comprising: a processor, a memory, a communication interface, and one or more programs, wherein:

the one or more programs is stored in the memory and configured to be executed by the processor, and the one or more programs comprises instructions configured for performing steps in the method according to claim 8.

17. An information transmission method, comprising:

receiving, by a terminal, a first Positioning Reference Signal (PRS) parameter from a location management network element, wherein the first PRS parameter is a parameter for a PRS sent aperiodically; and receiving, by the terminal, the PRS from the base station, wherein the PRS is sent by the base station according to a PRS trigger indication:

wherein the PRS trigger indication comprises PRS spatial relationship information; and wherein the PRS spatial relationship information comprises one or more of:

an index of a synchronization signal and physical broadcast channel (SS/PBCH) block of a serving cell or a serving base station, or an index of a synchronization signal and physical broadcast channel (SS/PBCH) block of a neighbor cell or neighbor base station.

18. The method according to claim 17, wherein the first PRS parameter is different from a parameter for a PRS sent periodically.

19. The method according to claim 17, wherein the first PRS parameter comprises a frequency resource parameter for the PRS and a time resource parameter for the PRS, where the time resource parameter for the PRS comprises an effective time for the PRS.

20. A terminal, comprising: a processor, a memory, a communication interface, and one or more programs, wherein:

the one or more programs is stored in the memory and configured to be executed by the processor, and the one or more programs comprises instructions configured for performing steps in the method according to claim 17.

* * * * *